Aug. 24, 1965  C. HORBERG, JR  3,201,860
METHODS AND APPARATUS FOR HANDLING, TRANSPORTING
AND ASSEMBLING MULTI-COMPONENT ARTICLES
Filed June 22, 1964  13 Sheets-Sheet 1
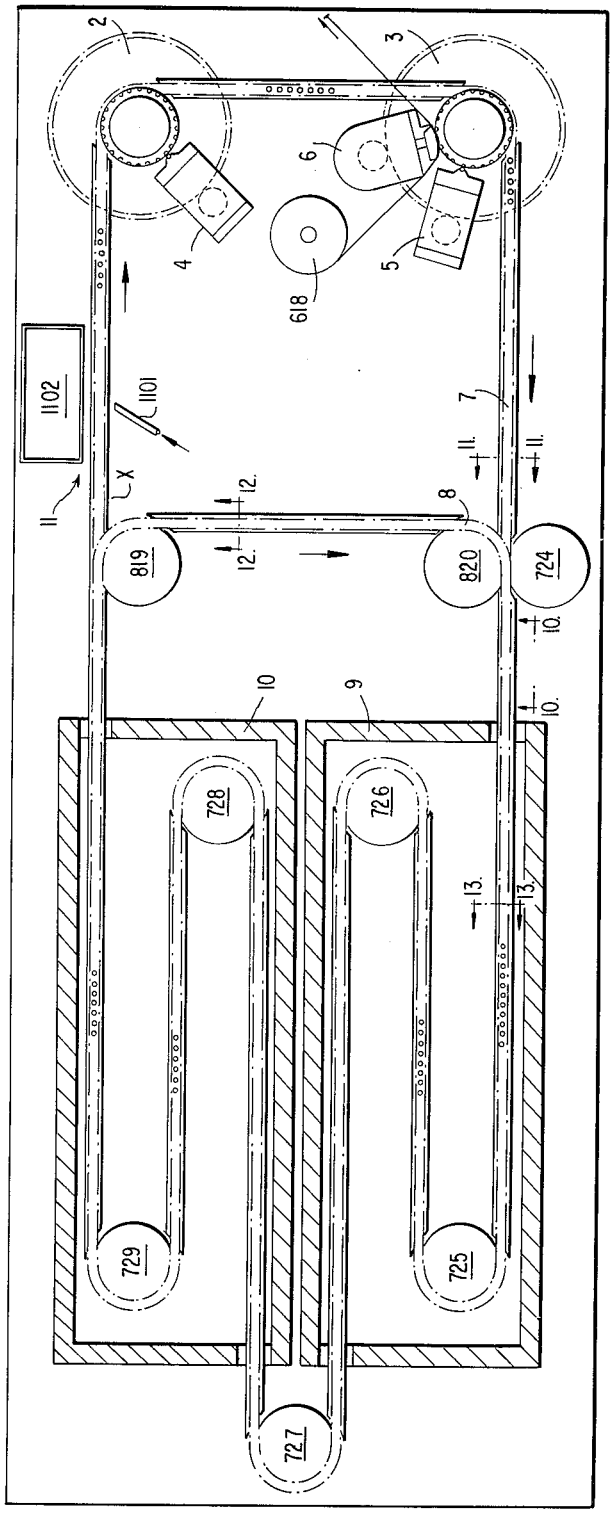
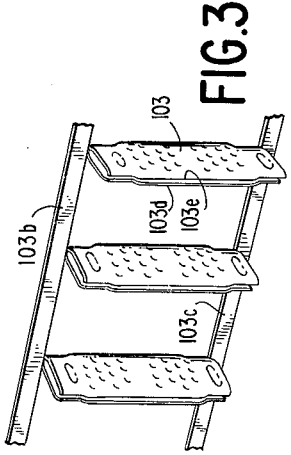
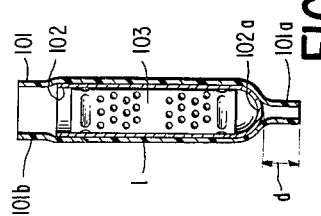
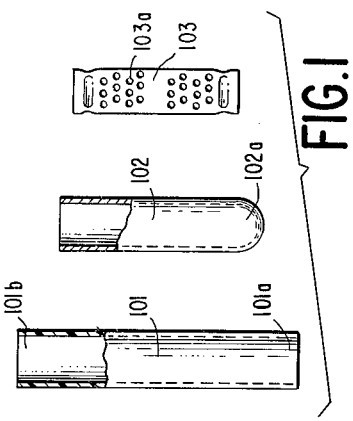
INVENTOR.
CHARLES HORBERG, JR.
BY
Burns, Doane, Benedict,
Swecker & Mathis
ATTORNEYS Aug. 24, 1965

C. HORBERG, JR 3,201,860

METHODS AND APPARATUS FOR HANDLING, TRANSPORTING
AND ASSEMBLING MULTI-COMPONENT ARTICLES

Filed June 22, 1964

INVENTOR.
CHARLES HORBERG, JR.

BY
Burns, Doane, Benedict, Swecker & Mathis

ATTORNEYS

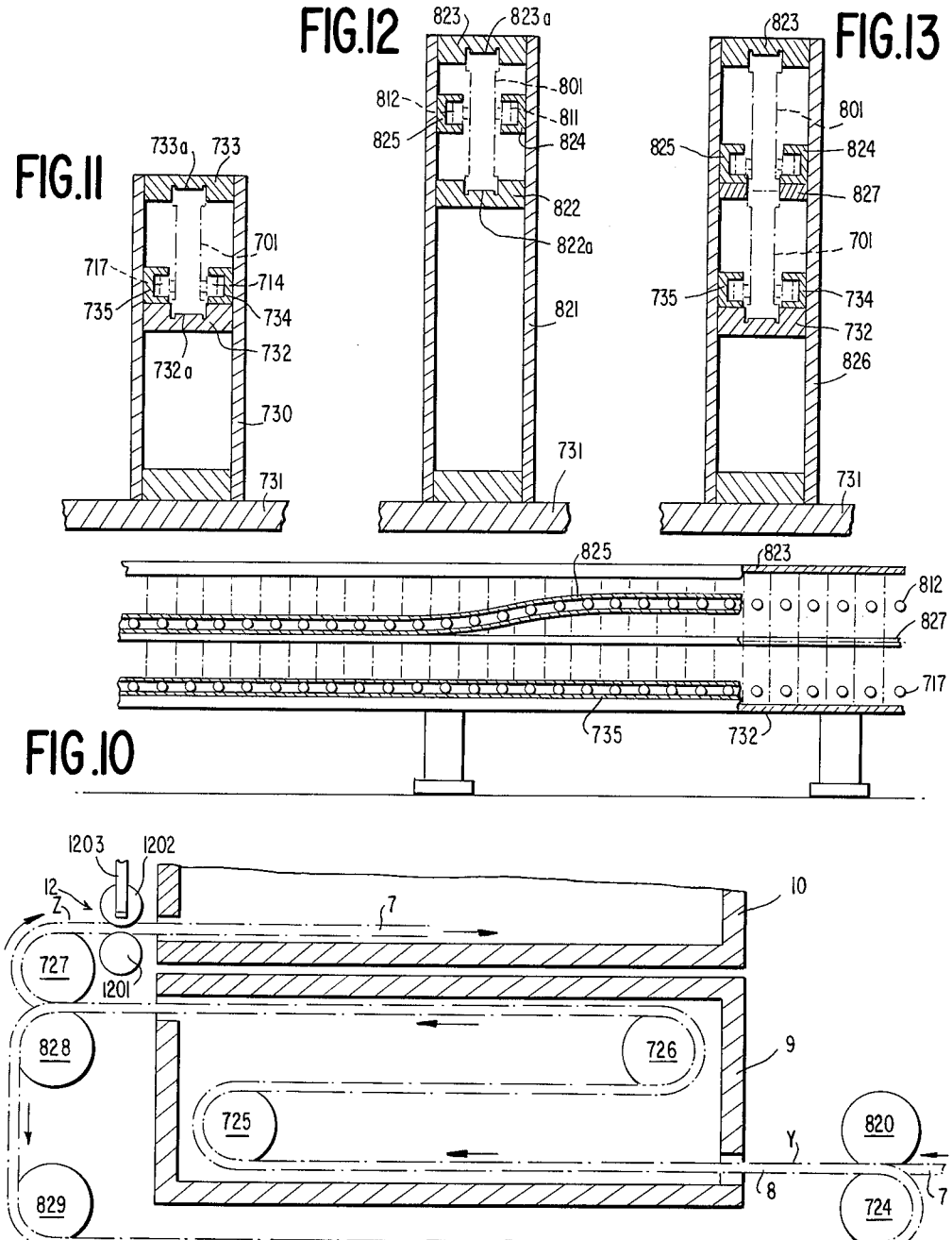

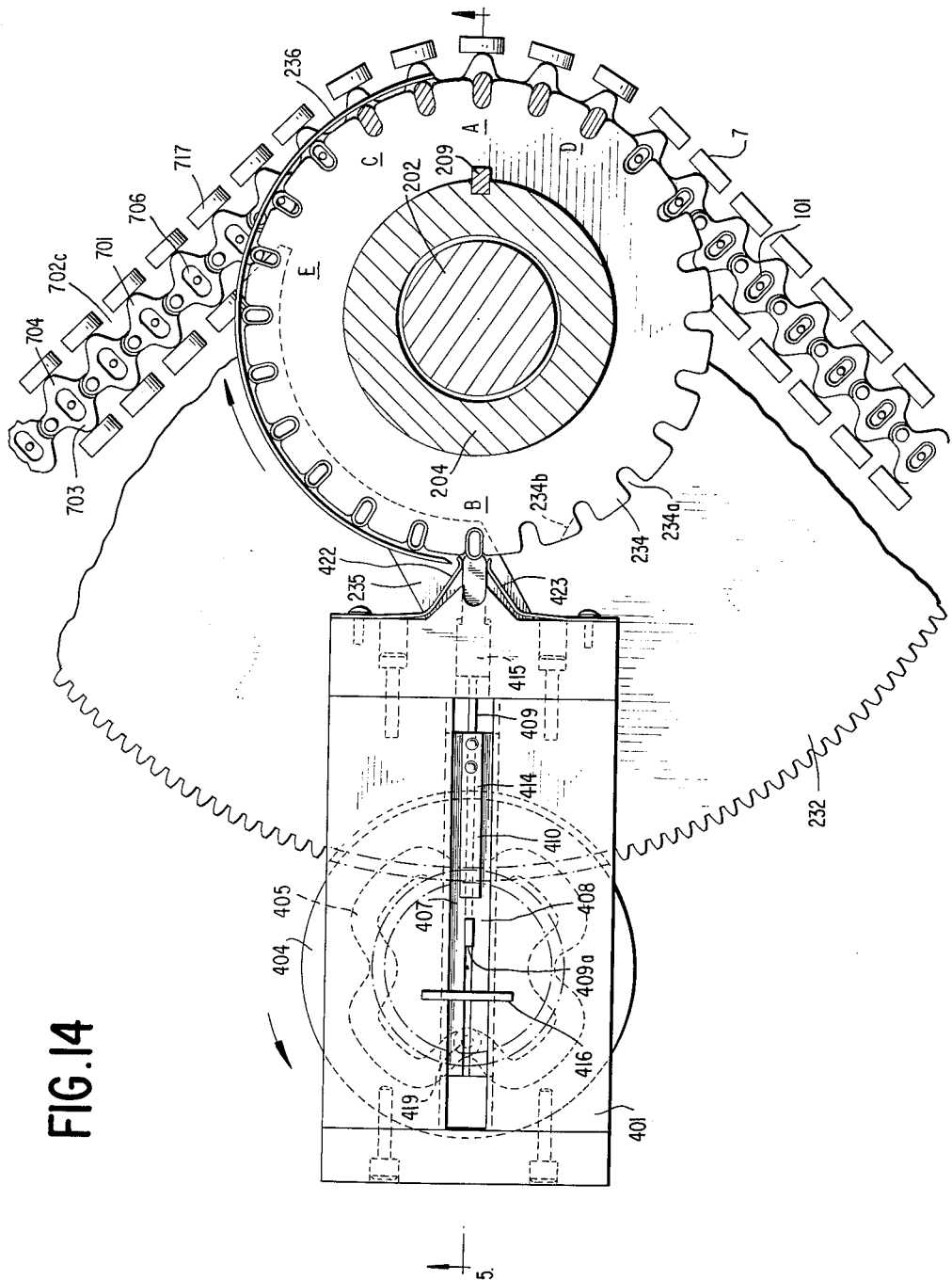

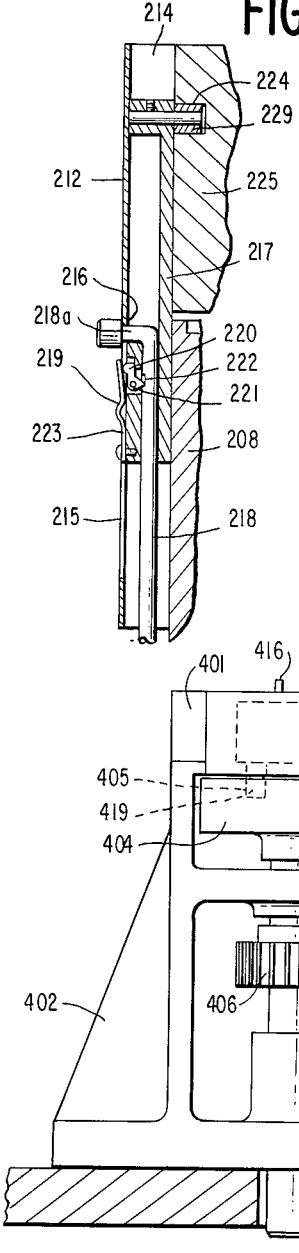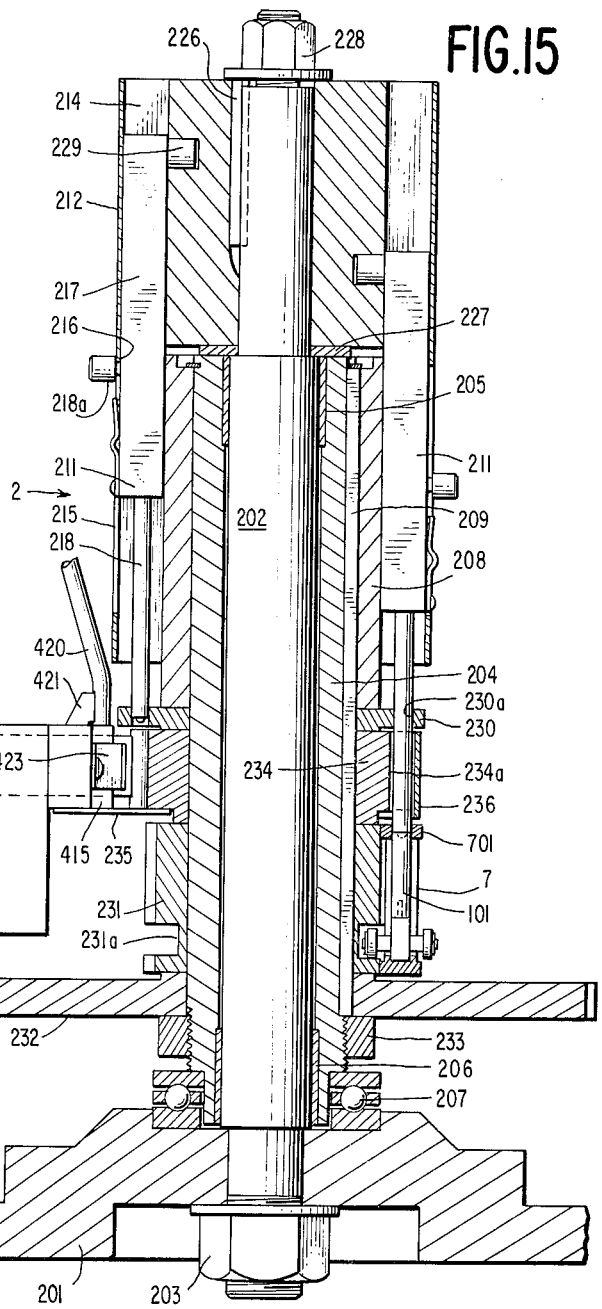

INVENTOR.
CHARLES HORBERG, JR.
BY
ATTORNEYS

Aug. 24, 1965   C. HORBERG, JR   3,201,860
METHODS AND APPARATUS FOR HANDLING, TRANSPORTING
AND ASSEMBLING MULTI-COMPONENT ARTICLES
Filed June 22, 1964   13 Sheets-Sheet 8

INVENTOR.
CHARLES HORBERG, JR.
BY
Burns, Doane, Benedict, Swecker & Mathis
ATTORNEY

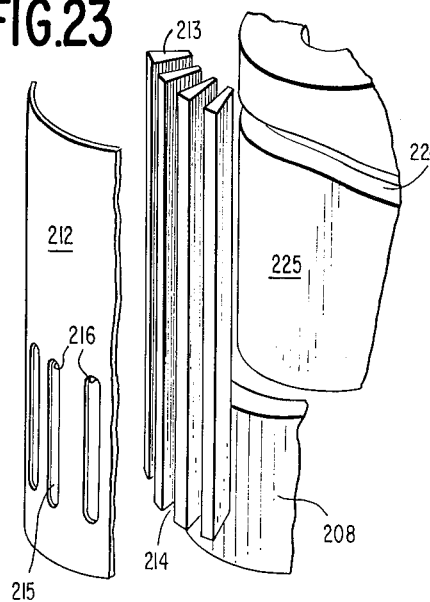
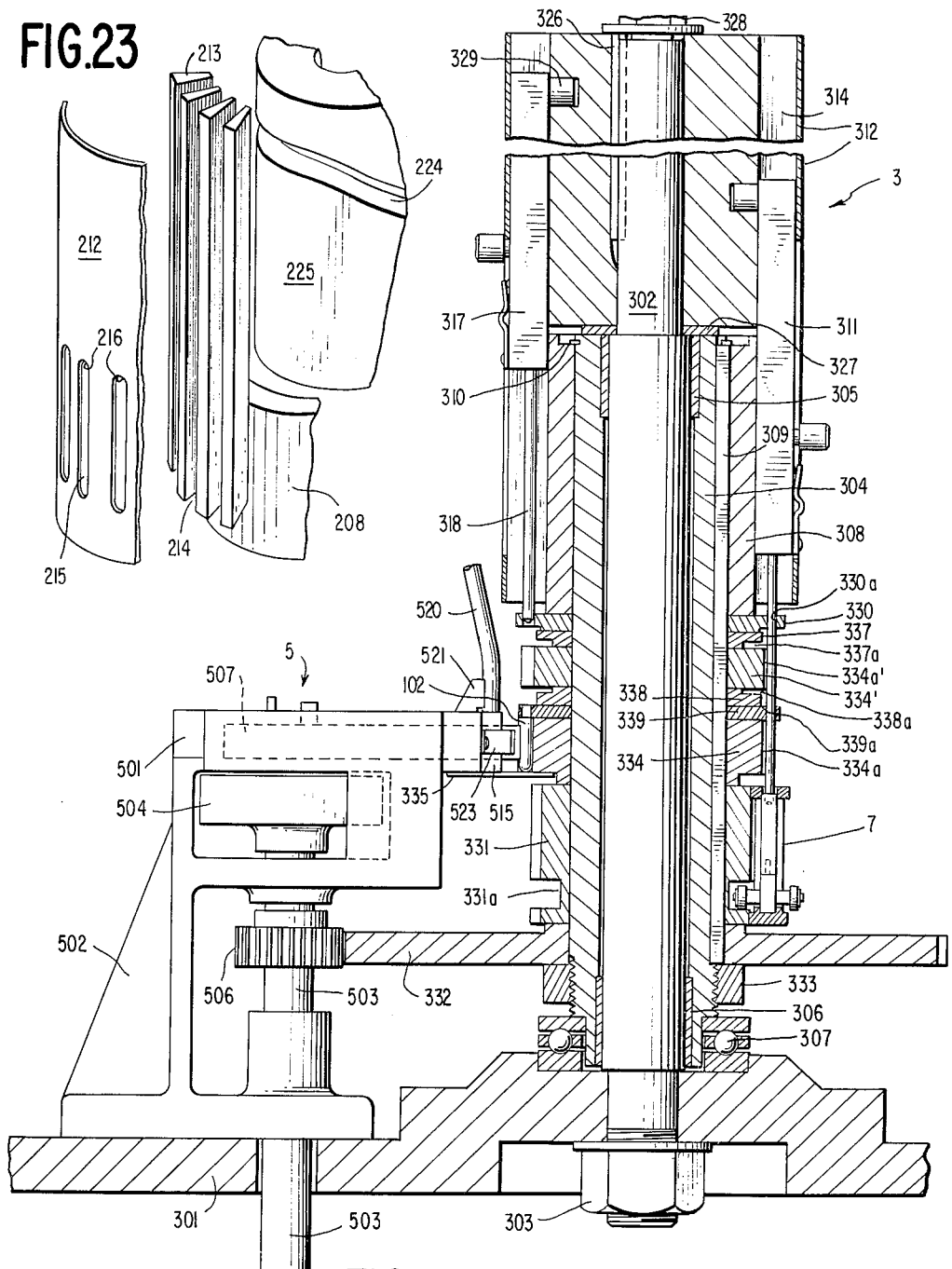
FIG.23
FIG.22
INVENTOR.
CHARLES HORBERG, JR.

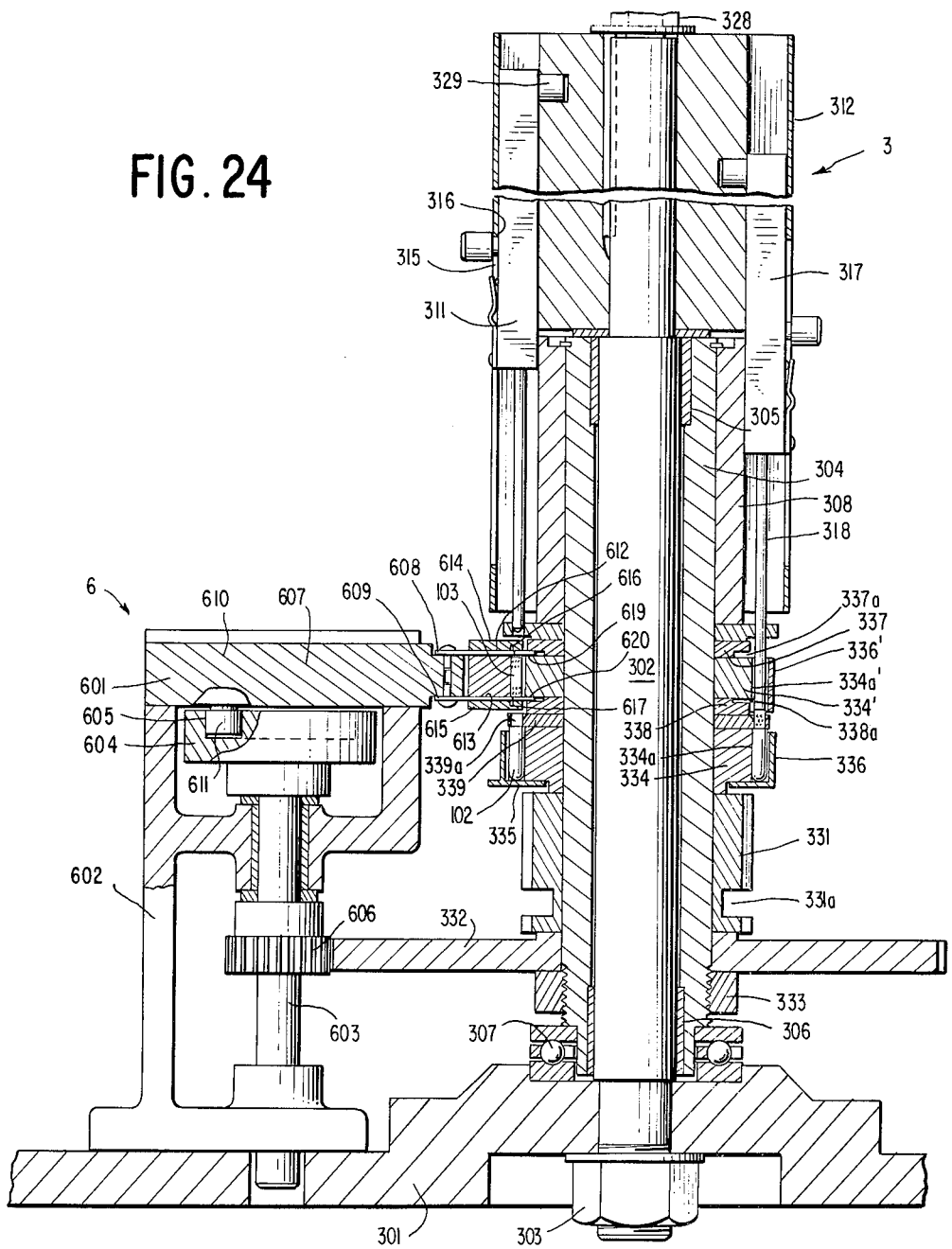

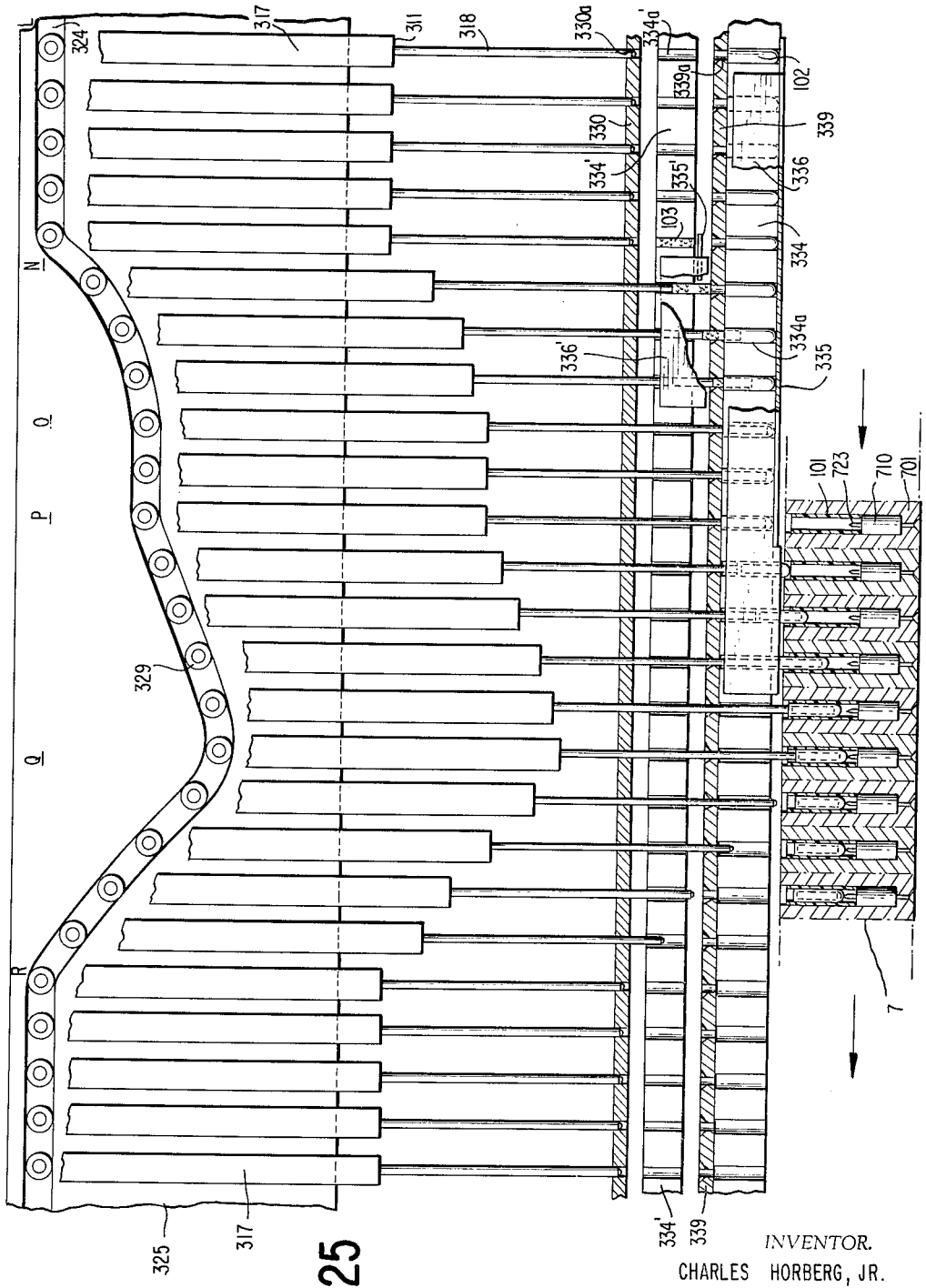

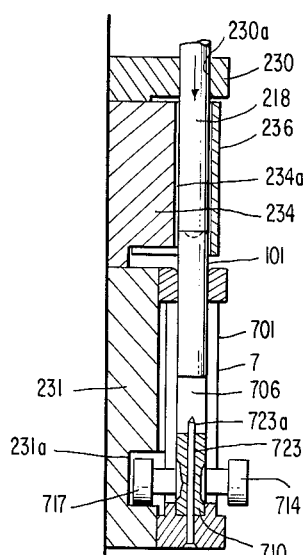
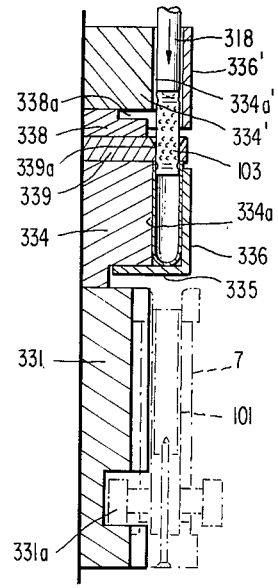
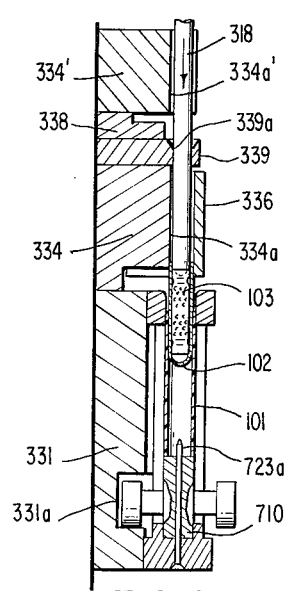
FIG.26  FIG.27  FIG.28
FIG.29  FIG.30  FIG.31
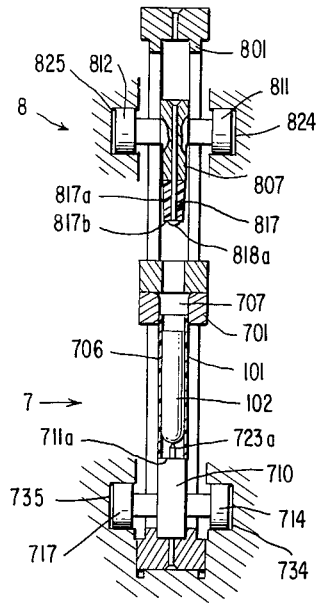
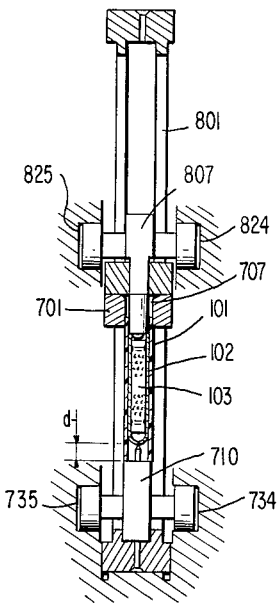
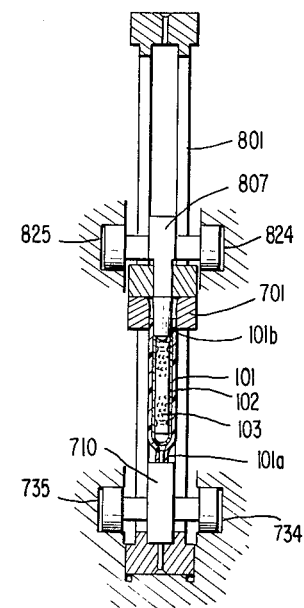

Aug. 24, 1965  C. HORBERG, JR  3,201,860
METHODS AND APPARATUS FOR HANDLING, TRANSPORTING
AND ASSEMBLING MULTI-COMPONENT ARTICLES
Filed June 22, 1964  13 Sheets-Sheet 13

INVENTOR.
CHARLES HORBERG, JR.
BY
Burns, Doane, Benedict,
Swecker & Mathis
ATTORNEYS United States Patent Office 3,201,860
Patented Aug. 24, 1965

3,201,860
METHODS AND APPARATUS FOR HANDLING, TRANSPORTING AND ASSEMBLING MULTI-COMPONENT ARTICLES
Charles Horberg, Jr., Northbrook, Ill., assignor to Paramount Textile Machinery Company, Chicago, Ill.
Filed June 22, 1964, Ser. No. 376,815
19 Claims. (Cl. 29—431)

This invention pertains to methods and apparatus for assembling, transporting, and handling multi-component articles. In particular, it relates to methods and apparatus for effecting the telescoping assembly of three components of an electrical connector.

An electrical connector now in common use and employed to interconnect two or more electrical wires includes inner, intermediate, and outer components. The inner component comprises a metal insert with internal prongs, which insert is generally die-stamped and formed. This insert comprises a sheet-like portion of metal which is formed into a generally tubular configuration with small prongs pressed out of the sheet so as to project into the hollow interior of the insert. The longitudinal edges of the sheet are slightly spaced so as to define a longitudinally extending gap. This gap facilitates the contraction of the formed insert during assembly of the connector components.

The intermediate connector components conventionally comprises a shell fabricated of metal such as copper. One end of this shell may be closed or open while the other end will remain open.

The outer, sleeve-like component of the connector comprises an initially tubular length of insulating material such as heat-shrinkable polyethylene.

During the fabrication of the connector assembly, the insert component is telescopingly inserted into the metal shell. The assembled metal shell and insert are telescopingly inserted into the insulating sleeve with there being a predetermined spacing between one end of the sleeve and one end of the metal shell. The assembled components are then treated to effect the contraction of the insulator sleeve about the overall assembly. Such contraction may be conveniently effected by placing the assembled components in a heated environment to cause the contraction of the heat-shrinkable insulator sleeve.

Each of the components of the electrical assembly heretofore described is relatively small and fragile. In attempting to effect the assembly of these components on a commercial scale, substantial problems have resulted. The assembly techniques thus far attempted have resulted in an inordinate number of imperfectly assembled or damaged connectors. Considerable difficulty has been encountered in obtaining the precise registration or relative alignment of the components necessary for their subsequent utilization with connector-applying, crimping tools.

An additional problem has involved the limiting of contraction of the electrical wire-receiving end of the insulator sleeve while the remainder of the sleeve is being contracted about the metal shell.

A particularly significant problem has involved the relative slowness with which electrical components have been heretofore assembled.

Recognizing the need for an improved technique for assembling multi-component articles such as, for example, the connector previously described, it is an object of this invention to provide methods and apparatus by means of which the assembly problems above noted may be substantially obviated or minimized.

It is a particular object of the invention to provide such methods and apparatus by means of which rapid and accurate assembly of multi-component articles may be effected, particularly where the components themselves are small and fragile.

Yet another object of the invention is to provide such methods and apparatus wherein the improper assembly of article components or the damaging of components or assembled articles is substantially minimized.

An additional object of the invention is to provide an assembly technique and apparatus which enable the maintaining of accurate registration, i.e., relative alignment, of article components while the components are being assembled.

A still further object of the invention is to provide methods and apparatus which are particularly adapted to the assembly of articles comprising a plurality of telescoped components and wherein the outer component is contracted about the inner components with the contraction of a portion of the outer component being limited.

It is likewise an object of the invention to provide such methods and apparatus which are characterized by basic simplicity, which require minimum operating space, and which additionally require minimum operator attention.

The methods and apparatus presented through this invention entail several inventive aspects.

One significant aspect of the overall invention, involves the structure and mode of operation of a combination including turret means associated with a plurality of article component feeding means adapted to successively supply article components thereto. Associated with this combination are plunger means carried by the turret means and adapted to successively, axially assemble some article components and to thereafter move the assembled article components telescopingly into other article components. Flexible conveyor means included in the combination transport assembled articles and define cavities adapted to contain these assembled articles. Means carried by the flexible conveyor means establish selected positions of alignment for at least some of the components of the articles.

Another aspect of the invention relates to the structure and mode of operation of a combination comprising first flexible conveyor means and second flexible conveyor means. The first conveyor means defines a plurality of multi-component, article-receiving cavities. Abutment means carried by the first conveyor means are adapted to define positions of relative alignment of at least some of the components of the articles being assembled. Slide means carried by the second conveyor means are adapted to be projected toward and at least partially into the cavities of the first conveyor means to force article components against the abutment means.

A still further aspect of the invention involves the specific character of the first conveyor means. This conveyor means comprises link chain means wherein at least some of the links include article-receiving cavities, each of which has at least one open end. Slide means are mounted in at least some of the cavities and are associated with means for effecting their reciprocation axially of the cavities to displace articles therefrom. Registration means are contained within at least some of the cavities and adapted to define positions of selected alignment for at least some of the components of the articles being assembled.

A still further aspect of the invention entails the specific character of the second conveyor means. This conveyor means also comprises link chain means. Slide means are carried by at least some of the links of this link chain means. Frustoconical surface means are carried by at least some of the slide means of the second conveyor means and are adapted to partially enter a first component of an article carried by the article conveyor means. The frustoconical surface means are adapted to limit contraction of a portion of the first article component while the remainder of the first article component is being contracted about the second article component. Annular shoulder means are carried by at least some of these slide means and are adapted to engage a second component of an article carried by the first conveyor means. Central abutment means are carried by at least some of the slide means of the second conveyor means and are adapted to engage a third article component carried by the first conveyor means.

An additional aspect of the invention relates to plunger means which effect the movement, feeding, or assembling of article components. Such plunger means are adapted to move articles from article supplying means such as a web, magazine, or turret to article receiving means such as component loading stations on a turret or the aforesaid link chain means. Such plunger means include a first plunger portion telescopingly connected with a second plunger portion. Clutch means are provided which are adapted to releasable secure the first and second plunger portions in mutually extended relationship. This clutch means is further adapted to allow relative convergence of the first and second plunger portions when movement of the article component engaging second plunger portion is impeded. Means are provided for re-extending the first and second plunger portions following their convergence. Such re-extension is effected in response to movement of the first plunger portion away from the article being moved. Signal means are carried by the plunger means and adapted to project outwardly of the plunger means in response to the convergence of the first and second plunger portion.

Additional features of the invention pertain to means for preventing movement of one article component off of a loading station while plunger means are advancing another article component thereinto and means for constricting a component being telescopingly moved into the interior of another component, both of which features are incorporated in unique combination with apparatus heretofore described.

In describing the invention reference will be made to preferred apparatus embodiment and modes of operation as shown in the accompanying drawings.

In the drawings:

FIGURE 1 is a schematic, elevational view of separated components employed in the fabrication of an electrical connector to be assembled by the overall apparatus of this invention;

FIGURE 2 is a partially sectioned, elevational view of an assembled electrical connector illustrating the relative position of connector components following the thermally induced contraction of the outer insulator sleeve component;

FIGURE 3 is a perspective, schematic view illustrating a conventional arrangement by means of which pronged insert components of the electrical connectors may be supplied in stamped and formed, web-like form;

FIGURE 4 is a schematic, plan view of the overall apparatus employed to effect the assembly of components shown in FIGURE 1 so as to yield the connector assemblies illustrated in FIGURE 2;

FIGURE 10 is an enlarged, elevational view of a portion of the FIGURE 4 apparatus as viewed along the view direction 10—10;

FIGURE 11 is an enlarged, transverse, sectional view of a portion of the FIGURE 4 apparatus as viewed along the section line 11—11;

FIGURE 12 is an enlarged, transverse, sectional view of a portion of the FIGURE 4 apparatus as viewed along the section line 12—12;

FIGURE 13 is an enlarged, transverse, sectional view of a portion of the FIGURE 4 apparatus as viewed along the section line 13—13;

FIGURE 14 is an enlarged, partially sectioned, plan view of a portion of the FIGURE 4 apparatus illustrating a portion of the apparatus wherein plastic insulator sleeves are successively supplied by first feed means to first turret means;

FIGURE 15 is a somewhat reduced, sectioned, elevational view of the FIGURE 14 portion of the apparatus as viewed along section line 15—15;

FIGURE 16 is an enlarged, partially sectioned view of a portion of the FIGURE 15 assembly illustrating details of one of the plurality of collapsible plunger assemblies carried by the first turret means and adapted to move plastic sleeves from the first turret means to the first conveyor means;

Figure 20:
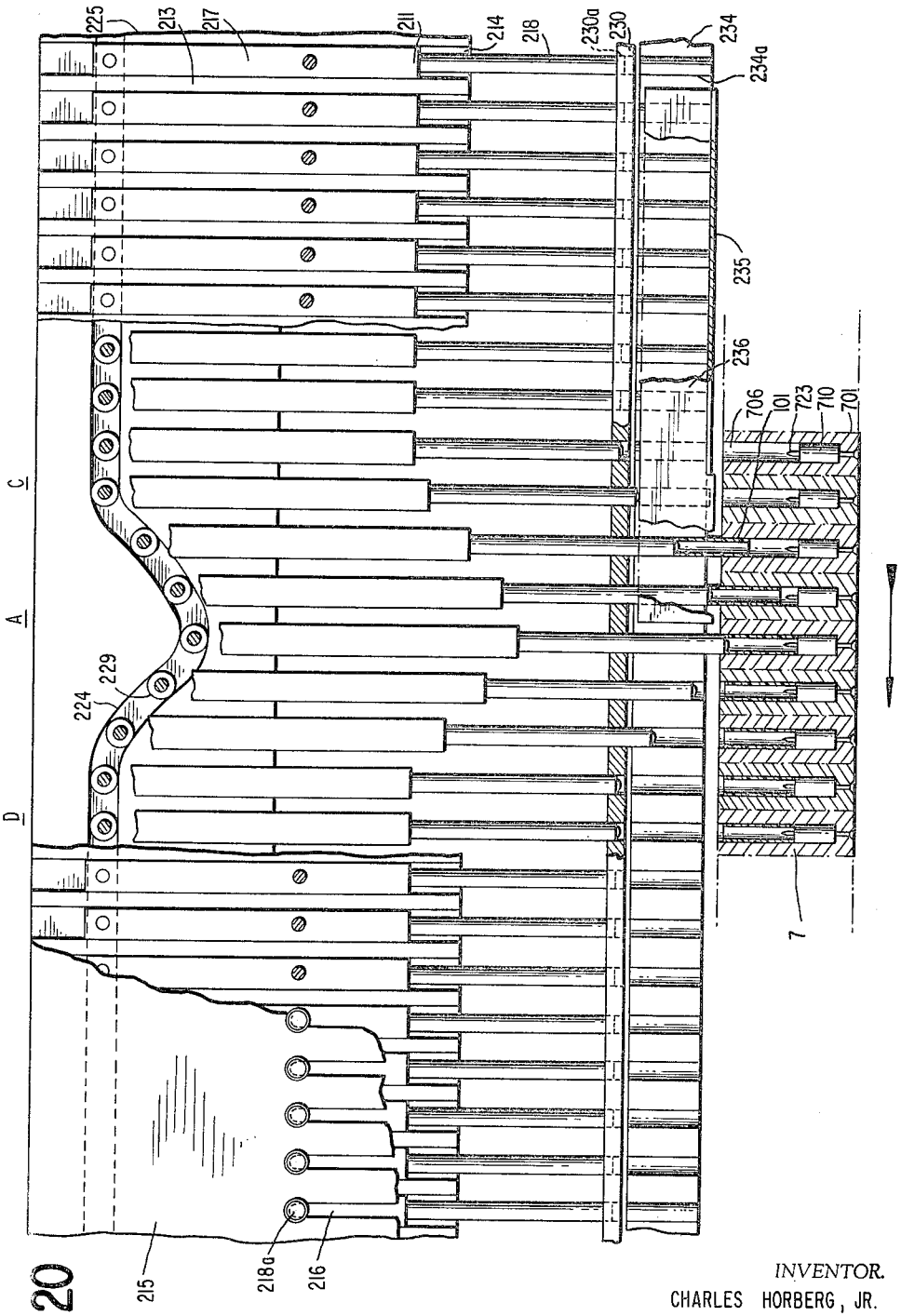
Figure 21:
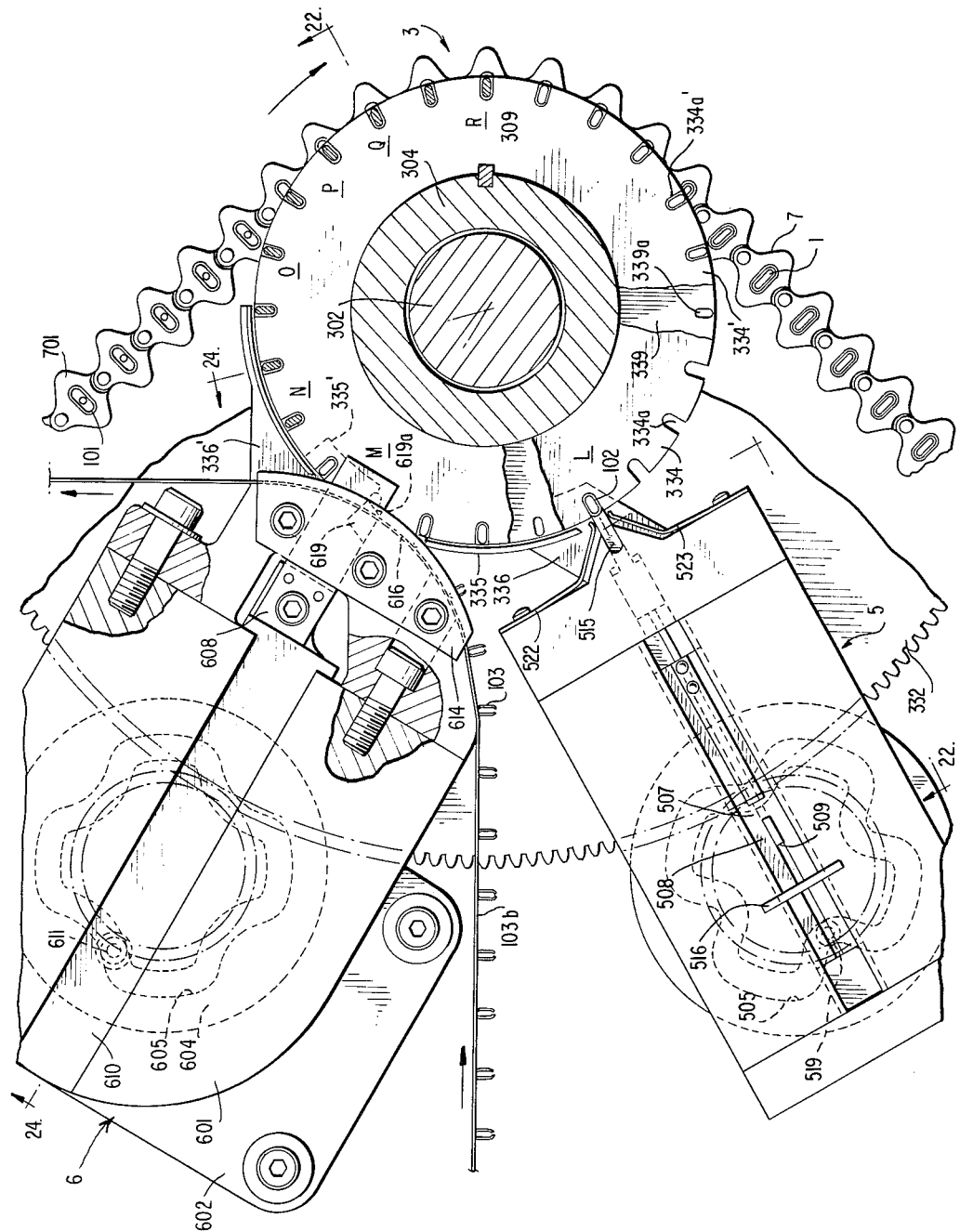
Figure 34:
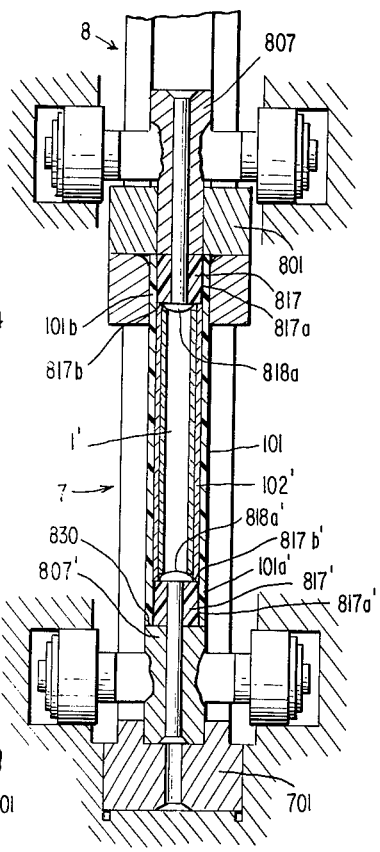
Figures 35, 36:
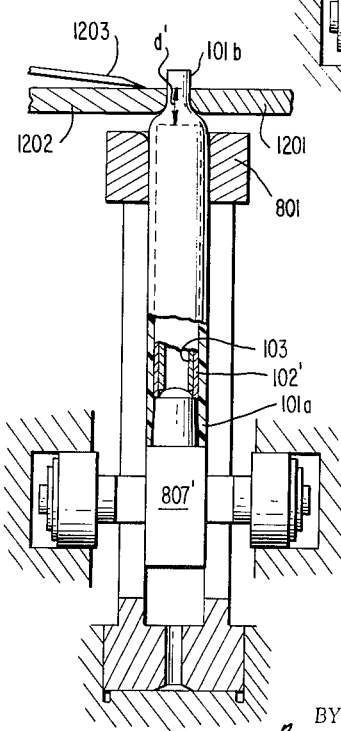

FIGURE 20 is a schematically developed, elevational view of the exterior of the first turret means and a portion of the first conveyor means illustrated in FIGURES 14 and 15 showing the cam-influenced sequence of operation of the plunger assemblies carried by the first turret means while such plunger assemblies are effecting the transfer of plastic sleeves from the first turret means to the first conveyor means;

FIGURE 21 is an enlarged, partially sectioned, plan view of a portion of the FIGURE 4 apparatus illustrating details of the second turret means and associated second and third feed means for successively supplying metal shell and insert components, respectively, to the second turret means at different loading levels;

FIGURE 22 is a somewhat reduced, partially sectioned, elevational view of the FIGURE 21 assembly as viewed along the section line 22—22 and illustrating details of the second feed means plunger mechanism for supplying metal shell components of the connector assembly to a lower loading station on the second turret means;

FIGURE 23 schematically illustrates components of the second turret means shown in FIGURE 22 and the first turret means shown in FIGURE 15 which serve to support plunger assemblies for guided, vertical, sliding movement thereon;

FIGURE 24 is a somewhat reduced, partially sectioned, elevational view of a portion of the FIGURE 21 assembly as viewed along the section line 24—24 and illustrating details of a third feed means plunger mechanism utilized to supply metal insert components to an upper loading station on the second turret means;

FIGURE 25 is an enlarged, developed view of the exterior of the second turret means and a portion of the first conveyor means shown in FIGURES 21, 22 and 24 and illustrating the sequence of cam-influenced operation of plunger assemblies carried by the second turret means while such plunger assemblies first telescopingly assemble inserts and metal shells and thereafter move such assembled inserts and shells off of the second turret means and into plastic sleeves previously disposed within cavities of the first conveyor means;

FIGURES 26 through 33 are partially sectioned, elevational views of portions of the FIGURE 4 apparatus illustrating the sequence of operation of various components of the overall apparatus during the assembly and ejection of connector articles;

FIGURE 34 is a vertical, sectional, elevational view illustrating a modified combination of slide assemblies which may be carried by the first and second conveyor means to effect the assembly and registration of a modified connector characterized by a metal shell which has both ends open;

FIGURE 35 illustrates the modified first and second conveyor means structure shown in FIGURE 34 subsequent to the withdrawal of slide means carried by the upper or second conveyor means following the registration of the connector components;

FIGURE 36 is a vertical, sectional, elevational view of the modified first conveyor means shown in FIGURE 34 illustrating the manner in which the modified slide means of the first conveyor means may partially elevate the registered components of the modified connector following the heating of the outer plastic sleeve to enable one end of the heat-softened sleeve to be pinched closed and trimmed; and FIGURE 37, adjacent FIGURE 10, is a plan view schematically illustrating an arrangement of the modified first and second conveyor means shown in FIGURES 34 through 36.

*Representative multi-component article*

FIGURES 1 through 3 illustrate a multi-component article 1 representative of a type of multi-component article which may be assembled with the apparatus of this invention.

Article 1 comprises a now widely used electrical connector which is employed to interconnect electrically conductive wires.

The components of the connector 1 are schematically shown in FIGURE 1.

An outer or first component of each connector 1 comprises a generally tubular length or sleeve 101 of insulator material such as heat-shrinkable polyethylene.

A second, intermediate and shell-like component 102 of each connector 1 is adapted to be telescopingly received with a sleeve 101 as shown in FIGURE 2. Each shell 102 is preferably metallic in character, has a generally oval cross section, and may be fabricated, for example, of copper or a copper alloy and may be provided with a closed end 102a.

The third or inner component 103 is metallic in character and may be provided with bent-in portions or prongs 103a. It is adapted to be telescopingly received within a shell 102.

Inserts 103 may be supplied in web-like form as shown in FIGURE 3. As there shown, a plurality of inserts 103 are integrally affixed to supporting web edges 103b and 103c and carried by these edges. Each insert 103 is formed by bending a sheet-like portion of metallic material into a generally tubular form with longitudinal edges 103d and 103e remaining slightly spaced as shown. With edges 103d and 103e being spaced, each insert 103 is slightly contractable in character, i.e. opposing forces exerted on the flattened sides of the inserts shown in FIGURE 3 will tend to converge the sides.

When each insert 103 is formed, as by conventional di-stamping, the prongs 103a formed during the stamping operation are disposed so as to project inwardly into the hollow interior of the insert.

As shown in FIGURE 2, each sleeve 101 of plastic or insulating material is adapted to telescopingly receive assembled insert 103 and shell 102. After an assembled insert 103 and shell 102 have been inserted into the interior of an insulating sleeve 101, the tube 101 may be subjected to heat so as to effect its contraction in a well-known fashion. When unrestrained, the sleeve 101 will contract to the extent shown at the lower end 101a of the sleeve in the assembled connector 1. Complete contraction of the upper end 101b of the sleeve is prevented in a manner to be hereinafter described so as to maintain this end open to receive electrical wires.

A connector 1 is secured to a plurality of electrical wires by merely inserting wires into the interior of the insert 103 and then crimping the connector onto these wires. To enable the utilization of standardized crimping tools especially adapted for the cirmping of the connector 1, it is desirable to maintain a controlled spacing between the extremity of the shell end 102a and the extremity of the plastic sleeve end 101a, as illustrated in FIGURE 2.

Ordinarily, the assembly 1 would have a length of about 1 inch. With this limited size, it will be apparent that the components of each connector 1 are relative fragile in character, vulnerable to damage, and difficult to manipulate.

*Basic elements of overall apparatus*

FIGURE 4 schematically illustrates a plan view of an overall apparatus or system which may be employed to automatically and effectively assemble multi-component articles such as the connector 1 heretofore described.

This apparatus includes article component supplying means which may comprise first turret means 2 and second turret means 3.

Article component feeding means are included in the system and may comprise first feeding means 4 adapted to successively supply plastic sleeve 101 to first turret means 2, second feeding means 5 adapted to successively supply shell components 102 to second turret means 3, and third feeding means 6 adapted to successively supply insert components 103 to second turret means 3.

Article receiving means are incorporated in the apparatus and includes first conveyor means 7. First conveyor means 7 comprises a flexible conveyor formed from hingedly interconnected links.

Second conveyor means 8 are incorporated in the overall apparatus or system and function to insure the proper positioning of the components of the connector 1. Second conveyor means 8, like first conveyor means 7, comprises a flexible conveyor of the link chain type. In view of the mode of fabrication of the first and second conveyor means, first conveyor means 7 will hereinafter be frequently referred to as first link chain means 7 while the second conveyor 8 will be often referred to as second link chain means 8.

Means for contracting the connector components 101 about the shells 102 are incorporated in the overall apparatus and may comprise a heating station 9 and a cooling station 10.

An ejection station 11 is provided to receive completely formed connector articles 1.

While the overall mode of operation of the apparatus will be hereinafter described in detail, the basic sequence of events will now be delineated to provide a brief perspective of the invention.

First feeding means 4 serves to successively supply plastic sleeves 101 to first turret means 2. Plunger assemblies carried by first turret means 2 successively move plastic sleeves 101 downwardly into cavities carried by first link chain means 7.

Second feeding means 5 successively supplies metal shell components 102 to a lower loading station on second turret means 3. Third feeding means 6 successively supplies metal insert components 103 to an upper loading station on second turret means 3.

Plunger assemblies carried on second turret means 3 first axially move inserts 103 into metal shells 102 disposed in aligned relation beneath them. Thereafter these plunger assemblies displace the assembled inserts 103 and shells 102 downwardly off of turret means 3 and into plastic sleeves 101 carried by cavities of link chain means 7.

Link chain means 7 thereafter transports assembled connector components to heating station 9. Prior to the entry of first link chain means 7 into the heating station 9, second link chain means 8 moves into aligned relation above first link chain means 7. Slide means carried by second link chain means 8 are projected downwardly so as to engage connector components carried by first link chain means 7 and insure their proper alignment while they are passing through the heating station 9.

While passing through heating station 9, the heating of the connector assemblies causes the contraction of the plastic lengths 101 about the shells 102.

Link chain means 7 carries articles from heating station 9 into a cooling station 10 to effect the setting, i.e. cooling, of the heated plastic lengths 101. Second link chain means 8 may remain in superposed alignment with first link chain means 7 throughout the travel path of connectors through heating station 9 and cooling station 10.

After first link chain means 7 emerges from the cooling station 10, slide means carried thereby effect the ejection of the completed connectors 1 at ejection station 11.

*First turret means*

First turret means 2 is illustrated in FIGURES 4, 14, 15, 16, 17, 18, 20, and 23.

First turret means 2 includes a base 201 to which a vertically extending shaft 202 is immovably affixed by means such as the threaded securing nut 203 shown in FIGURE 15.

A turret hub 204 is journaled on shaft 202 by means which may include bushings 205 and 206. A ball-type, thrust bearing assembly 207 may be interposed between base 201 and hub 204 as generally shown in FIGURE 15.

A sleeve-like mandrel 208 may be attached to hub 204 for unitary rotation with the hub by means such as the key 209. Relative axial movement between the mandrel 208 and hub 204 may be prevented by means such as the schematically shown, retaining ring 210.

Plunger means are rotatably carried with mandrel 208 and comprise a plurality of circumferentially spaced plunger assemblies 211.

Each plunger assembly is mounted for longitudinal, reciprocating movement on mandrel 208. As shown in FIGURE 23 this mounting arrangement may include a longitudinally slotted retaining sleeve 212 and circumferentially spaced ridges 213. Ridges 213 define a plurality of circumferentially spaced, plunger assembly receiving and guiding grooves 214. Turret components 208, 213, and 212 are interconnected so as to define a unitary assembly by conventional fastening means, not shown, such as welding, threaded fasteners, etc.

Retaining sleeve 212 may be provided with a series of circumferentially spaced, vertically extending slots 215. As illustrated, each slot 215 is longitudinally aligned with a groove 214 and terminates in an abutment defining, upper end 216.

Each plunger assembly 211, as shown in FIGURES 15 and 16, includes a first or upper plunger portion 217 and a lower or second plunger portion 218. As illustrated in FIGURE 16, lower, article component engaging plunger portion 218 is telescopingly mounted on upper plunger portion 217 for longitudinal, telescoping movement relative to upper plunger portion 217.

Clutch means 219 are adapted to releasably interconnect the upper and lower plunger portions 217 and 218. Clutch means 219 may comprise, as shown in FIGURE 16, a detent 220 which is pivotally mounted on upper plunger portion 217 by pivot pin 221. Each detent 220, when engaged in a notch 222 formed in the lower plunger portion 218 as shown in FIGURE 16, and when held in engagement with this notch by means such as a resilient leaf spring 223 secured to upper plunger portion 217, tends to secure the plunger portions in their relatively extended position shown in FIGURE 16. In this extended position, the lower plunger portion 218 is moved downwardly as far as possible in relation to the upper plunger portion 217.

As will be apparent, if downward movement of lower plunger portion 218 should be impeded so as to exert a pivoting force on the detent 220 sufficient to overcome the biasing effect of spring 223, detent 220 will be caused to pivot out of notch 222 so as to enable the relative convergence of the plunger portions 218 and 217. When such convergence or collapsing of the plunger portions occurs, the detent 220 will pivot outwardly of the plunger assembly 211 so as to provide a visible signal reflecting the convergence or collapsing of the plunger assembly. This outwardly or laterally extending detent 220 may be employed to actuate appropriate safety mechanisms for preventing or stopping operation of certain components of the apparatus in a well understood and conventional fashion. For example, conventional limit switches controlling the operation of machine components may be interposed in the travel path of laterally extending detents 220 so as to be actuable in response to engagement with the projected detents 220 when such detents are carried past these limit switches.

The restoring of converged or collapsed plunger portions 217 and 218 to their extended positions shown in FIGURE 16, may be effected by abutment means defined by the upper ends 216 of sleeve slots 215. When convergence of plunger portions has occurred during downward movement of a plunger assembly 211, subsequent upward movement of this assembly 211 will cause the plunger portions 217 and 218 to be separated to their fully extended positions. This extension will result by continuing the upward movement of the upper plunger portion 217 while the upper end 218a of the lower plunger portion 218 is engaged by the abutment defining slot end 216. With the lower plunger portion 218 thus restrained against upward movement while the upper plunger portion 217 is moving upwardly, the detent 220 will again be brought into alignment with the notch 222 so as to resecure the upper and lower plunger portions in their extended position.

Vertical reciprocation of each plunger assembly 211 is effected by cam means including a cam groove 224 circumferentially extending about the periphery of a cam body 225. Cam body may be connected by means such as key 226 to stationary shaft 202. Cam body 225 may be axially spaced from the rotatable turret hub 204 by means such as the schematically shown bearing and spacer disc 227. Means such as a threaded securing nut 228 may be employed to secure cam body 225 against axial movement relative to the upper end of stationary shaft 202.

A knob-like cam follower 229 of cylindrical configuration extends from each upper plunger portion 217 into the cam groove 224.

As illustrated in FIGURES 15 and 20, the elevation of cam groove 224 varies progressively around the circumference of cam body 225. Thus, as the plunger assemblies 211 are rotated with mandrel sleeve 208, the plunger assembly cam followers 229, in moving through groove 224, will cause longitudinal, reciprocating movement of the upper plunger portions 217. With a detent 220 engaged with a notch 222 of a plunger assembly 211, reciprocating movement of the upper plunger portion 217 of the assembly will induce corresponding reciprocating movement of the lower plunger portion 218 of that assembly.

Sliding stability of the plunger portions may be further assured through the utilization of a lower guide plate 230. Guide plate 230 is provided with circumferentially spaced apertures 230a adapted to slidingly receive and guide the lower ends of the lower plunger portions 218 as shown in FIGURE 15.

The rotatable components of turret means 2, i.e. hub 204, mandrel sleeve 208, plunger assemblies 211, retaining sleeve 212, etc., are connected with and driven by first link chain means 7 by sprocket wheel 231. Sprocket wheel 231 may be provided with an annular recess 231a to receive laterally projecting portions of slide assemblies carried by link chain means 7 as hereinafter described.

A transmission gear 232, like sprocket wheel 231, may be keyed with hub 204 by key 209 and secured on hub 204 by a threaded retaining nut 233. Gear 232 serves to transmit driving energy to first feeding means 4.

In the illustrated embodiment, link chain means 7 is utilized to impart rotation to the rotatable components of turret means 2 by driving sprocket wheel 231 with which it is meshed.

Rotation of the rotatable turret components causes the plunger assemblies 211 to rotate about the cam body 225 and to reciprocate vertically through slots 214 due to the camming cooperation between cam groove 224 and cam follower knobs 229. As shown in FIGURE 20, the cam groove is so configured as to effect the reciprocation of each cam assembly within a limited portion of the circumferential travel path of the plunger assemblies 211.

As shown in FIGURES 14 and 15, the lower extremity of the reciprocating movement of each plunger assembly 211 may occur at point A diametrically opposite to point B where plastic lengths 101 are fed from first feeding means 4 onto the first turret means 2.

As shown in FIGURES 14 and 20, the cycle of reciprocation of each plunger assembly 211 occurs within an arc extending between points C and D where article receiving cavities of link chain means 7, to be hereinafter described, are axially aligned with lower plunger portions 218.

FIGURES 14 and 15 illustrate the structure of a first loading station carried by first turret means 2. This first loading station, which is adapted to successively receive plastic sleeve components 101 supplied by first feeding means 4, comprises a loading disc 234 which is connected through key 209 to turret hub 204 for unitary movement therewith.

Loading disc 234 includes a plurality of vertically extending and circumferentially spaced, plastic sleeve receiving slots 234a. The width W of each slot 234a is slightly less than the diameter of the plastic sleeve 101. Thus, each initially cylindrical sleeve 101 is deformed into a somewhat oval configuration when inserted into a slot 234a and frictionally held within this slot. However, as shown by phantom line 234b in FIGURE 14, the outer portion of the leading edge of each slot of loading disc 234 (and other loading discs subsequently described) may be sloped so as to enlarge the slot opening and facilitate sleeve loading.

It is desirable to incorporate in turret means 2 means for preventing inadvertent movement of plastic lengths 101 out of the slots 234a between the loading point B and the discharging point A. Such retaining means may comprise a lower retaining plate 235 extending from first feeding means 4 circumferentially around and immediately beneath loading disc 234. Plate 235 extends between point B and point E where link chain means 7 moves into aligned position beneath loading disc 234.

The retaining means may further include an outer, arcuate, side retaining plate 236 projecting longitudinally upward from lower retaining plate 235 as shown in FIGURE 14. Side plate 236 extends from a point close to loading point B to a point close to discharge point A as shown in FIGURE 14.

As will be appreciated, slots 234a are axially aligned with plunger portions 218 and are additionally axially aligned with article receiving cavities of link chain means 7 in the arcuate zone extending between point C and D. Thus, cam influenced reciprocation of the plunger assemblies between the point C and D will be effective to successively move plastic lengths 101 out of slots 234a and into cavities of link chain means 7.

*Second turret means*

Second turret means 3 is illustrated in FIGURES 21, 22, 24 and 25.

Second turret means 3 correspond in general structure to turret means 2 except that it is provided with two superposed loading stations as opposed to the single loading station or disc incorporated in the first turret means 2.

As previously described, second turret means 3 is adapted to receive shells 102 from second feeding means 5, to receive inserts 103 from third feeding means 6, to effect the telescoping assembly of these connector components, and to thereafter displace these assembled components off of turret means 3 and onto first link chain means 7.

Second turret means 3 includes a base 301 to which a stationary, vertically extending shaft 302 is secured by a lower securing nut 303.

A hub 304 is journaled on shaft 302 by an upper bushing 306 and a lower bushing 305. A ball type, thrust bearing assembly 307 is interposed between hub 304 and base 301 as shown in FIGURES 22 and 24.

A sleeve-like mandrel 308 is connected for unitary, rotary movement with hub 304 by a longitudinally extending key 309. A retaining ring 310 may be employed to secure the mandrel 308 against axial movement upwardly off of the hub 304.

A plurality of plunger assemblies 311 corresponding in general structure to the plunger assemblies 211 of first turret means 2 are circumferentially spaced about the periphery of second turret means 3. Such plunger assemblies 311 may be contained on the turret means 3 by a slotted retaining sleeve 312. The individual plunger assemblies 311 are constrained for longitudinal and guided reciprocating movement between the retaining sleeve 312 and the mandrel 308 by a ridge and groove arrangement corresponding to that incorporated in the first turret means 2 and schematically illustrated in FIGURE 23.

Such a guiding arrangement is provided by vertically extending ridges 313 which define a plurality of vertically extending and circumferentially spaced guiding grooves 314.

Vertically extending and circumferentially spaced slots 315 formed in retaining sleeve 312 include upper closed ends 316. Slot ends 316 define abutment means for effecting the re-extension of converged or collapsed portions of plunger assemblies 311 as previously described in connection with the plunger assemblies 211 of first turret means 2.

Each plunger assembly 311, like the plunger assemblies 211, includes an upper plunger portion 317 and a lower plunger portion 318. A clutch 319 releasably interconnects these plunger portions and includes a detent and detent pivot pin, not shown, but corresponding to the detent 220 and detent pivot pin 221 of the plunger assemblies 211. A notch corresponding to the notch 222 of the plunger assemblies 211 is provided in each plunger portion 318. A resilient, clutch actuating leaf spring 323 serves to releasably interconnect the detent and notch of the clutch 319 in a manner akin to that previously described in connection with the plunger assemblies 211.

Vertical reciprocating movement of plunger assemblies 311 is effected by a cam groove 324 which is formed on the outer periphery of cam body 325. Cam body 325 is connected to shaft 302 by a key 326 and may be spaced somewhat from the rotatable turret hub 304 by an interposed bearing disc 327 as shown. Cam body 325 may be secured by an upper securing nut 328.

Each upper plunger portion 317 includes a generally radially and inwardly projecting knob type cam follower 329 which extends into the circumferentially extending and continuous cam groove 324.

The lower ends of the lower plunger portions 318 may be stabilized by apertures 330a defined by an apertured guide plate 330.

First link chain means 7 is meshingly interconnected with a sprocket wheel 331 as illustrated in FIGURES 21, 22, and 24. Sprocket wheel 331, which is connected to hub 304 by key 309, may include a recessed portion 331a to accommodate laterally projecting slide components of link chain means 7 as illustrated in FIGURE 22.

A gear 332 connected with hub 304 by key 309 may serve to transmit driving energy to hub 304. Drive gear 332 may itself be actuated by a geared drive shaft of second feeding means 5 in a manner to be hereinafter described, as illustrated in FIGURE 22.

Drive gear 332 transmits driving energy to the rotatable components of second turret means 3 as well as to first link chain means 7. Drive gear 332 may be secured against sprocket wheel 331 by a retaining nut 333.

A second loading station of the overall apparatus which is carried by second turret means 3, comprises a lower, peripherally slotted loading disc 334 as shown in FIGURES 22 and 24. Lower loading disc 334 is connected by key 309 to hub 304 so as to be rotatable with this hub. Disc 334 includes a plurality of vertically extending and circumferentially spaced peripheral slots 334a. Each of the slots 334a is adapted to receive a copper shell 102 from second feeding means 5.

Shell retaining means to prevent inadvertent movement of shells out of slots 334a between the time these shells are loaded on disc 334 and discharged therefrom may be provided. Such retaining means may include a lower retaining plate 335 extending from second feeding means 5 and lying immediately beneath and partially circumferentially around loading disc 334. The retaining means may additionally include a side retaining plate mounted with lower retaining plate 335 and extending arcuately, partially around the periphery of loading disc 334. Plate 335 may extend between the points where metal shells 102 are loaded upon and discharged from the loading disc 334.

A third loading station of the overall apparatus comprises an upper loading disc 334' mounted on second turret means 3 above loading disc 334. Loading disc 334' may be supported between mounting plates 337 and 338 which, as illustrated in FIGURES 22 and 24, define annular recesses 337a and 338a on opposite sides of loading disc 334'. Recesses 337a and 338a are adapted to accommodate reciprocating cutter blades in a manner to be hereinafter described.

Upper loading disc 334' is provided with a plurality of vertically extending and circumferentially spaced peripheral slots 334a'. Each loading slot 334a' of upper loading disc 334' is axially aligned with a lower plunger portion 318 and a loading slot 334a of lower loading disc 334.

Loading disc 334' is adapted to successively receive inserts 103 from third feeding means 6 in a manner to be hereinafter described. Each insert 103 thus received is contained within a peripheral slot 334a'.

As shown in FIGURES 21 and 24, retaining means may be associated with upper loading disc 334' to prevent the inadvertent movement of metallic inserts 103 out of loading slots 334a'. Such retaining means may include a lower retaining plate 335' which extends immediately beneath and partially circumferentially around the outer periphery of upper loading disc 334'. This retaining means may additionally include an arcuate, side retaining plate 336' which extends partially peripherally around and lies immediately adjacent the loading disc 334'.

A mechanism for constricting inserts 103 as they are moved downwardly from loading disc 334' into metallic shells 102 carried by lower loading disc 334 may comprise an apertured plate 339. Plate 339 is disposed between loading discs 334 and 334' as shown in FIGURES 22 and 24. Plate 339 may include a plurality of circumferentially spaced apertures 339a, each of which is axially aligned with a slot 334a' of loading disc 334' and a slot 334a of loading disc 334.

Each aperture 339 is dimensioned so as to be somewhat smaller in width than the width of inserts 103. The upper end of each aperture 339a may be chamfered as illustrated. Thus, each insert 103, in passing from a slot 334a' into a shell 102 contained within a slot 334a, will be somewhat constricted as it passes through an aperture 339a. This constriction facilitates the telescoping assembly of inserts 103 and shells 102 and allows the inserts to resume their original configuration after being inserted into shells 102 so as to frictionally engage the inner walls of these shells.

FIGURES 21 and 25 illustrate the various points at which sequential assembly operations accomplished by second turret means 3 are initiated and accomplished. In the vicinity of point L, shell components 102 are loaded onto lower loading disc 334. In the vicinity of point M, inserts 103 are loaded onto the upper loading disc 334'. At point N, cam groove 324 is so configured as to cause the plunger assemblies 311 to begin their downward movement so as to start to move the inserts 103 out of loading slots 334', through constricting apertures 339a, and into shells 102 contained within loading slots 334a.

As shown in FIGURE 25, lower retaining plate 335' terminates at or immediately prior to point N so as to enable inserts to be moved downwardly out of loading slots 334a'. However as also shown in FIGURE 25, side retaining plate 336' may extend as far as point O where the plunger assemblies 311 have completely forced the inserts 103 into the shells 102.

While the assembly of the inserts 103 and the shells 102 is being accomplished by the downwardly moving plunger assemblies 311, the lower retaining plate 335 associated with the loading disc 334 prevents downward movement of the shells 102 off of the loading disc 334.

Cam track 324 may be configured for a short distance subsequent to point O so as to cause the plunger assemblies 311 to dwell until the point P is reached. At this point, or just prior thereto, the lower retaining plate 335 terminates so as to then allow downward movement of the assembled shells 102 and inserts 103, as shown in FIGURE 25. Subsequent to point P cam track 324 is so configured as to cause the plunger assemblies to resume their downward movement so as to displace the assembled shells and inserts from loading slots 334a into plastic lengths 101 previously loaded into cavities of link chain means 7.

Following the completion of the downward movement of the plunger assemblies 311 at point Q where the assembled inserts and shells have been moved downwardly to the maximum extent into cavities of link chain means 7, cam track 324 is then configured so as to restore the plunger assemblies 311 to their upward position by point R.

As will be apparent at least between points P and R the article component receiving cavities of link chain means 7 should be axially aligned with the plunger assemblies 311.

*First feeding means*

First feeding means 4 is illustrated in FIGURES 14, 15, 17, 18 and 19.

First feeding means 4 comprises a plunger type feeding mechanism. This mechanism is cyclically operated so as to successively transfer plastic sleeves 101 from a supply magazine to each of the loading slots 234a of the first loading station or disc 234 as this disc rotates. In the context of this feeding operation, as well as others to be subsequently described, the connector components being fed may themselves be considered to be articles.

First feeding means 4 comprises an upper body 401 connected by a bracket portion 402 to base 201. A vertically oriented drive shaft 403 is conventionally founded in bracket 402 and body 401 as schematically shown in FIGURE 15. A cam body 404 is carried by drive shaft 403 for unitary rotational movement therewith and is disposed within body 401 as shown. Cam body 404 is provided with a plural lobed cam groove 405, a representative configuration of which is shown in plan view in FIGURE 14.

A drive gear 406, connected with drive shaft 403 is meshingly interengaged with gear 232 of first turret means 2.

A feed plunger mechanism 407 is mounted for horizontal sliding movement within body 401 in generally radial alignment with turret means 2 as shown in FIGURE 14. Feed plunger mechanism 407 comprises a multi-component, collapsible plunger of the same general type as the plunger assemblies 211 incorporated in turret means 2.

Each feed plunger mechanism 407 includes a first component 408 within which a second plunger component 409 is telescopingly mounted. A plunger clutch 410 comprises, as in the case of the plunger assemblies 211, a detent 411 connected by a pivot pin 412 to first plunger portion 408 and a notch 413 adapted to receive the detent 411 and carried by the second plunger portion 409. A leaf spring 414 secured to first plunger portion 408 tends to resiliently bias detent 411 into notch 413 so as to interengage the plunger portions 408 and 409 for unitary reciprocating movement. The outer end of second plunger portion 409 may be provided with a plastic sleeve engaging pusher member 415.

Clutch 410 is adapted to allow the convergence or collapsing of plunger portions 408 and 409 when movement of pusher 415 toward loading disc 234 is impeded. Such impedance may result through the occurrence of the jam in the feeding operation. When collapsing of the plunger portions occurs, as in the case of the plunger assemblies 211, the detent 411 will project laterally from the plunger assemblies so as to provide a signal of the collapsed plunger condition. The projecting clutch detent, of course, as previously indicated, may be employed to actuate conventional safety mechanisms by tripping a micro switch to effect the stopping or disabling of one or more machine components.

Figure 18:
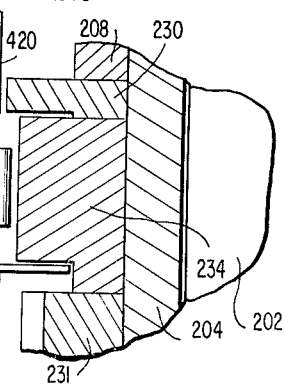
FIGURE 18 is a sectioned, elevational view of the plunger mechanism illustrated in FIGURE 17 as viewed along the section line 18—18.
Figure 19:
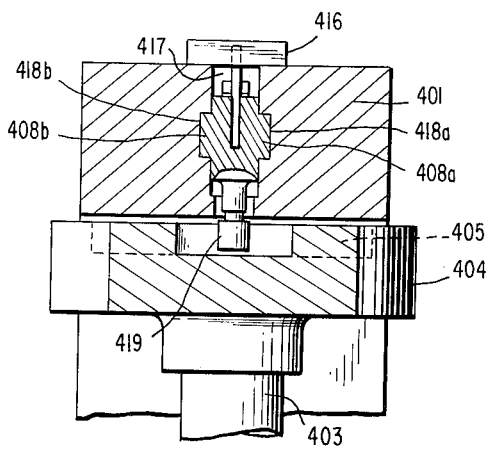
FIGURE 19 is a transverse, sectional view of the FIGURE 18 plunger mechanism as viewed along the section line 19—19.

The restoring of a collapsed plunger mechanism 407 to the extended condition shown in FIGURE 18 may be effected by an abutment rod 416 carried by the body 401 and adapted to engage an end 409a of the second plunger component 409 when the plunger mechanism is moving away from the loading disc 234.

Plunger mechanism 407 may be disposed within slotted body portion 417. Mechanism 407 may be provided with key-like components 408a and 408b on first plunger portion 408 which are disposed within body grooves 418a and 418b.

Reciprocating movement of each plunger mechanism 407 within slotted body portion 417 is effected by a knob like cam follower abutment 419. Follower 419 which projects downwardly from first body portion 408 into cam groove 405.

The gear ratio existing between gears 232 and 403 and the number of lobes defined by cam groove 405 are selected so as to cause the plunger mechanism 407 to reciprocate at such a cyclic rate as to be extended fully toward each loading disc slot 234a when it appears in a radial alignment with the plunger mechanism 407 during rotation of the disc 234.

Individual plastic sleeves 101 may be successively disposed between pusher portion 415 and loading disc 234 by conventional gravity flow through a tubular magazine 420. Magazine 420 may be connected to body 401 by a bracket 421 as shown.

Figure 17:
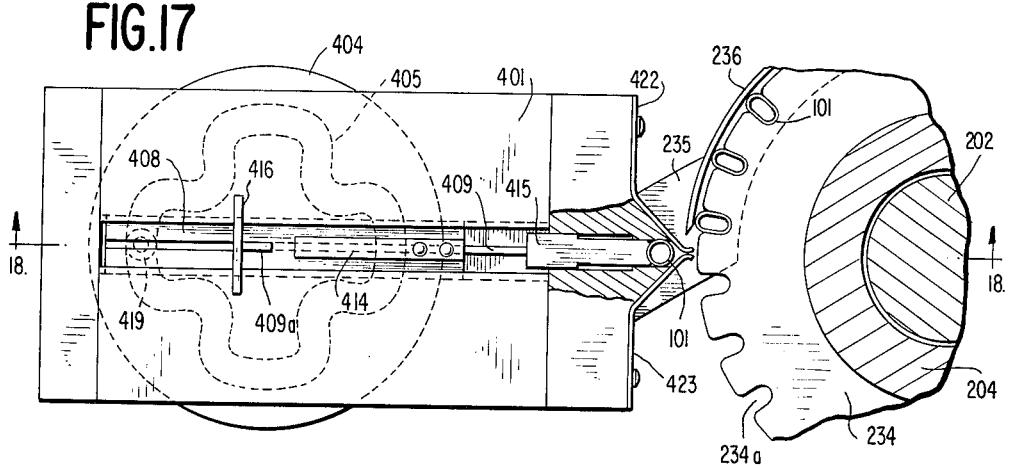
FIGURE 17 is a plan view of a portion of the FIGURE 14 assembly illustrating a plunger mechanism utilized to successively move plastic sleeves from a supply magazine to a sleeve loading disc carried by the first turret means and illustrating the portion of the plunger mechanism disposed in a position to move a plastic sleeve away from the plastic sleeve feeding mechanism.

Each article 101 as it drops by gravity out of the lower end 420a of tubular magazine 420 is disposed in axial alignment with plunger pusher 415. Resilient leaf springs 422 and 423 as shown in FIGURE 17 may be employed to prevent inadvertent outward movement of each such discharged plastic sleeve 101 prior to the pushing action of plunger portion 415. When the plunger portion 415 is moved toward the loading disc 234 through the cooperation of cam follower 419 and cam groove 405, each discharged plastic sleeve 101 is moved axially off of the first feeding means 4 and onto a loading slot 234a of the first loading station.

In being moved into the loading slots 234a, each plastic sleeve 101 is deformed from an initially cylindrical into a generally oval configuration as shown in FIGURE 17 owing to the limited width of each slot 234a. In the event that the pusher 415 should not effect the complete insertion of a plastic sleeve 101 into a loading slot 234a, the leading end 236a of side retaining plate 236 will cam the partially loaded article component 101 fully into its loading slot 234a.

*Second feeding means*

Second feeding means 5 is illustrated in FIGURES 21 and 22.

Feeding means 5 comprises a reciprocating plunger type of feeding mechanism employed to successively supply metal shell components 102 to the second loading station, i.e. loading disc 334. The cycle of operation of the plunger mechanism is coordinated with the rate of rotation of loading disc 334 so as to enable a shell 102 to be fed to each slot 334a as the disc 334 is rotated on second turret means 3.

Second feeding means 5 is similar in structure and operation to first feeding means 4 and for this reason need not be described in detail. In briefly describing the structure of the second feeding means 5, the reference numerals utilized correspond in the last two digits to the reference numerals utilized to describe the first feeding means 4.

Major components of feeding means 5 comprise a body 501 connected by bracket 502 to base 301. A drive shaft 503 supports a cam body 504 on the upper end of which is formed a multi-lobed cam groove 505.

A gear 506 is carried by and keyed to shaft 503 and is meshingly engaged with gear 332 of second turret means 3 as shown in FIGURE 22.

Shaft 503 may extend to a conventional drive mechanism, not shown, by means of which driving energy is transmitted to the entire apparatus shown in FIGURE 4. With this arrangement, driving energy is transmitted through gear 503 and gear 332 to effect the operation of turret means 3. Link chain means 7, in being interconnected with sprocket wheel 331 of second turret means 3 and sprocket wheel 231 of first turret means 2, transmits driving energy to first turret means 2 and first feeding means 4. In a manner to be hereinafter described, a geared connection between second turret means 3 and third feeding means 6 transmits driving energy to this latter feeding means. Through the utilization of conventional axially spaced sprocket wheels carried on a common shaft, second link chain means 8 may be interconnected with first link chain means 7 to be driven thereby in a manner to be subsequently described.

A plunger mechanism 507 is reciprocably mounted within body 501 and includes collapsible plunger portions 508 and 509 which are interconnected by a clutch mechanism. This clutch mechanism corresponds to clutch mechanism 410 incorporated in first feeding means 4.

A pusher 515 is carried on the outer end of second plunger portion 509. Pusher 515 is adapted to engage metal shell components 102 and displace them axially into loading slots 334a at loading station 334.

An abutment rod 516 carried by a body 501 may be utilized to effect the re-extension of collapsed plunger portions on the return or outward stroke of the plunger mechanism 507.

A cam follower knob 519 projects downwardly from first plunger portion 508 into cam groove 505.

A tubular magazine 520, connected by a bracket 521 to body 501, successively supplies metal shell components 102 to a position in front of and axially aligned with plunger pusher 515. Leaf springs 522 and 523 resiliently resist outward movement of discharge metal shell components so as to prevent movement of these components off of feeding means 5 except under the pushing influence of plunger assemblies 507.

Feeding means 5 operates like feeding means 4 to transfer metal shell components from magazine 520 to slots 334a of loading disc 334 in time relation with the rate of rotation of this disc. Properly timed operation of feeding means 5 is assured by selecting an appropriate gear ratio between gears 506 and 332 and an appropriately configured cam groove 505 as will be readily understood by those skilled in the art.

Third feeding means

Third feeding means 6 is illustrated in FIGURES 21 and 24.

Feeding means 6 comprises a mechanism for feeding web carried insert components 103 into meshing engagement with loading slots 334a' of third loading station 334'. This feeding mechanism additionally includes a reciprocating knife assembly adapted to sever insert components 103 from their supporting web after they have been meshingly inserted into slots 334a'.

The cycle of operation of the knife assembly is so timed as to insure the severing of each insert 103 from its supporting web when it has been disposed in a loading slot 334a' axially aligned with the reciprocating knife assembly of third feed means 6.

Feed means 6 comprises a body 601 connected by a bracket 602 to base 301.

A shaft 603 journaled in bracket 602 and body 601 carries, for unitary rotational movement therewith, a cam body 604. Cam body 604, on its upper face, is provided with a multi-lobed cam defining groove 605.

A drive gear 606 connected to shaft 603 is meshingly interengaged with gear 332 and driven by this gear.

A knife assembly 607 is mounted in body 601 for reciprocating movement in a direction extending generally radially of turret means 3 as shown in FIGURE 21. Knife assembly 607 comprises a pair of shearing blades 608 and 609 which are horizontally spaced and aligned and mounted upon a shear body 610. Shear body 610 is drivingly interconnected with cam body 604 by a knob type cam follower 611 which projects from shear body 610 into cam groove 605.

As illustrated in FIGURE 24, shear blades 608 and 609 are adapted to reciprocate through horizontal slots 612 and 613 formed in body 601. Body portions 614 and 615 define shear edges adjacent slots 612 and 613 which cooperate respectively with shear blades 608 and 609.

Mutually facing, arcuate slots 616 and 617 formed respectively in body portions 614 and 615. Slots 616 and 617 define guide ways to receive edge portions 103b and 103c of the web-like strip which carries inserts 103. Guide slots 616 and 617 are so configured as shown in FIGURE 21 so as to guide inserts 103 supported by web edges 103b and 103c into meshing interengagement with loading disc slots 334a'.

Conventional web feeding means, not shown may be employed to feed the insert carrying web structure through the slots 616 and 617 of feed means 6 so as to effect the timed inter-positioning of inserts 103 within the loading slots 334a'.

As schematically shown in FIGURE 4, the insert 103 supplying web may be carried on a supply roll 618 and unrolled from this roll 618 to pass to feed means 6.

Shear blades 608 and 609 are provided respectively with shear slots 619 and 620. These shear slots, which are identically configured are horizontally spaced so as to sever the upper and lower ends respectively of inserts 103 from the supporting web edges 103b and 103c.

As shown in FIGURE 21 the shear slot 619, of the blade 608, like the shear slot 620 of the shear blade 609, is provided with a cutting edge 619a which slopes outwardly and away from the oncoming, insert bearing web.

As shown in FIGURE 24 annular slots 337a and 338a on turret means 3 are adapted to receive the forward ends of the shear blades 608 and 609 when these blades are projected radially toward the turret means 3 sufficiently to align the shear slots 619 and 620 with an oncoming insert 103. When this oncoming insert 103 is at least partially inserted into a loading slot 334a' radially aligned with the shear mechanism 607, the shear blades 608 and 609 are withdrawn radially outwardly so as to sever the insert 103 from the web edges 103b and 103c. The thus severed insert 103 is then retained within its loading slot 334a' by side retaining plate 336' and lower retaining plate 335'.

Web edges 103b and 103c continue past loading station 6 to a conventional take-up mechanism not shown.

The diameter ratio existing between gears 606 and 332 and the configuration of cam groove 605 is selected so as to effect the reciprocation of cutter assembly 607 in timed coordination with the rotation of loading disc 334' so as to sever each web carried insert 103 as it is loaded into a slot 334a'.

As will be apparent, a reciprocating plunger type of insert loading mechanism similar to first feeding means 4 and second feeding means 6 may be utilized when inserts 103 are supplied in individualized rather than web carried form.

First link chain means

First conveyor or link chain means 7 and its structural details are illustrated in FIGURES 4 through 11 and 13.

The function of link chain means 7 is to transport assembled connectors 1 and connector assemblies between various work stations and to insure the proper alignment of these components during the assembly operation.

Figure 5:
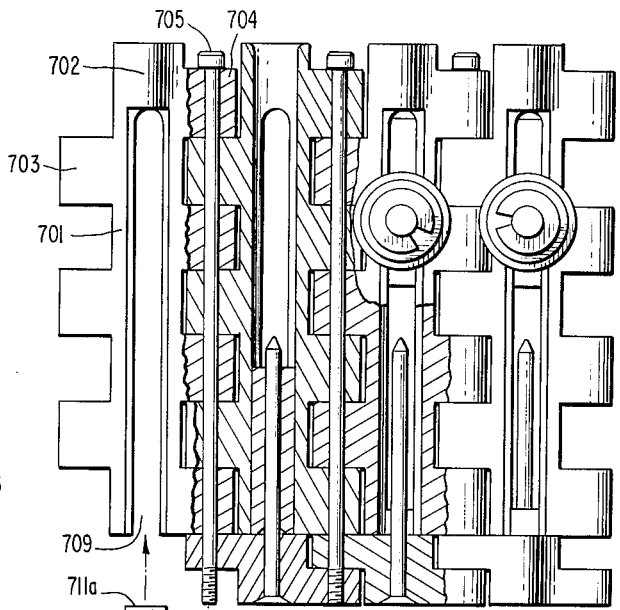
FIGURE 5 is a partially sectioned, elevational view of several interconnected links which are utilized to form conveyor means for transporting, registering, and ejecting assembled connectors and illustrating some of the components of one link in separated form.
Figure 7:
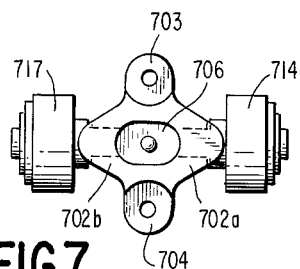
FIGURE 7 is a top plan view of the link shown in FIGURE 6.
Figure 8:
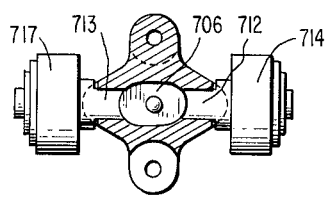
FIGURE 8 is a sectional view of the FIGURE 6 link as viewed along the section line 8—8.

Link chain means 7 is fabricated from a plurality of hingedly interconnected chain links 701, several of which are shown in elevation in FIGURE 5.

Each chain link 701 comprises a link body 702, which may be cast. Each link body is provided with a plurality of spaced projecting ears 703 on one side which are offset with respect to laterally projecting ears 704 extending from the other side of the link body. Link ears 703 and 704 of adjacent link bodies 702 are adapted to intermesh as shown in FIGURE 5. The link ears 703 and 704 are apertured to receive a link body connecting pin 705 as shown in FIGURE 5.

Figure 6:
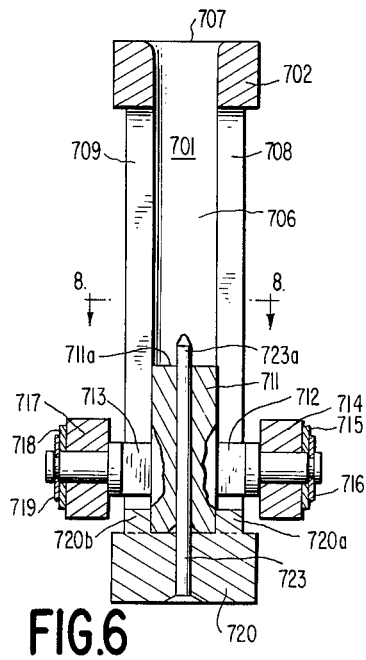
FIGURE 6 is a transverse, sectioned, elevational view of one of the links shown in the FIGURE 5 assembly.

Each link body 702 includes a generally oval shaped, article receiving cavity 706 which extends from an open cavity end 707a at the upper end of each link body 702, longitudinally through the link body. Link body slots 708 and 709 project laterally from and intersect cavity 706 as shown in FIGURE 6. As further shown in FIGURE 6, both the upper and lower end of slots 708 and 709 are closed when the link components are assembled.

Slide means comprising a slide assembly 710 are disposed within each link body 702. Slide assembly 710 has a generally annular slide body 711 of oval cross-section which is adapted to be slidably disposed within link body cavity 706.

Annular slide body 711 is provided with a pair of transversely extending, stub axles 712 and 713 as shown in FIGURE 6. Stub axle 712 is adapted to project through slot 708 while stub axle 713 projects through slot 709.

A roller type cam follower 714 is mounted on stub axle 712 and secured by a washer 715 and a snap ring 716. Another roller type cam follower 717 is mounted on the stub axle 713 and is secured by a washer 718 and snap ring 719.

As shown in FIGURE 5, each slide assembly 710 may be raised within cavity 706. Slide 710, for example, is illustrated in a partially raised position.

The lower ends of slots 708 and 709 are closed by a link body cap 720, as diagrammatically shown in FIGURE 5. Each link body cap is provided with offset ears 721 and 722 which are apertured to receive connecting pin 705. As illustrated the aperture in lower link ear 722 may be threaded so as to be threadably connectable with the lower threaded end of a connecting pin 705.

Cap portions 720a and 720b, shown in FIGURE 6, project respectively into slots 708 and 709 to maintain these slots in a fully open condition.

An abutment defining registration pin 723 is carried by link body cap 720 and projects axially into cavity 706 when the cap 723 is connected to the link body 702 as shown in FIGURE 5. Registration pin 723 projects through the hollow interior of slide body 711. The upper pin end 723a projects above the annular abutment defining end 711a of slide body 711 when the slide body 711 is in its lowermost position, engaging link body cap 720 as shown in FIGURE 6.

In a manner to be hereinafter described, upper, abutment defining, pin end 723a is adapted to engage and define the position of the lower end of a shell component 102 while annular abutment 711a is adapted to engage and define the proper position of the lower end of a plastic sleeve 101.

Each link body 702 includes laterally projecting winglike portions 702a and 702b. As shown in FIGURE 14, for example, the adjacent wing portions of adjacent links in the connected conveyor means 7 define recesses 702c adapted to meshingly receive sprocket teeth of the various sprocket wheel assemblies with which the link chain 7 is engaged.

As will be apparent, when the link chain means 7 is engaged with a sprocket wheel, the slide assembles 710 must be so disposed as to not interfere with the meshing engagement of the link chain means 7 with the sprocket wheel. Thus, as shown in FIGURE 15, when link chain means 7 engages sprocket wheel 231, the slide assemblies 710 are disposed in their lowermost position and are partially received within the annular recess 231a of sprocket wheel 231.

Link chain means 7 is mounted on sprocket wheels including sprocket wheel 231 of first turret means 2 and sprocket wheel 331 of second turret means 3. As heretofore described, sprocket wheel 331 imparts driving movement to link chain means 7. Link chain means 7 may be additionally supported and guided by idler type and schematically shown sprocket wheel assemblies 724, 725, 726, 727, 728, and 729. One or more of these sprocket wheels such as the sprocket wheel 727 may be provided with conventional tensioning means to maintain proper tensioning of the overall link chain means 7.

In the spaces between the sprocket wheel assemblies, chain supporting arrangement may be provided as schematically shown in FIGURES 4, 10, 11, and 13.

Frame portions 730 extending from a base 731 may carry a lower support rail 732 and an upper guide rail 733. Opposing grooved portions 733a and 732a of rails 733 and 732 are adapted to guidingly engage the upper and lower ends respectively of the links of link chain 7 so as to guide and support this conveyor. Rails 732 and 733 extend horizontally and are appropriately positioned relative to the various sprocket wheels engaging link chain 7 so as to insure the continuous planar travel of link chain means 7. Where link chain means 8 overlies link chain means 7, upper guide rail 733 may be replaced by a slotted guide rail as hereinafter described.

Generally C-shaped cam tracks 734 and 735 are carried by frame portion 730. Tracks 734 and 735 are adapted to receive the roller type cam followers 714 and 717 of slide assemblies 710 as shown in FIGURE 11. The elevation of these cam tracks is appropriately varied, in an obvious fashion, so as to induce the desired sliding movements of slide assemblies 710 within the link cavities 706.

*Second link chain means*

Second link chain means 8 is illustrated in FIGURES 4, 9, 10, 12, and 13.

Link chain means 8 is fabricated of hingedly interconnected links and is disposed so as to move through a horizontal path superposed, in part, above first link chain means 7.

Figure 9:
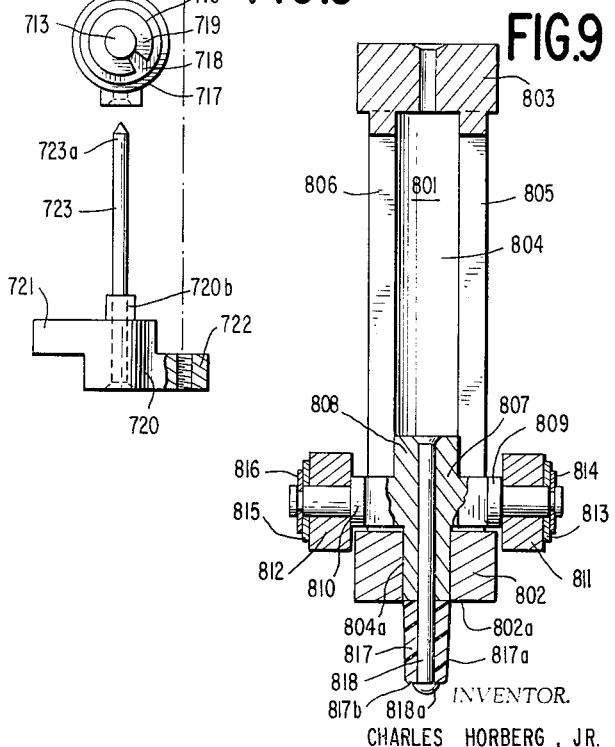
FIGURE 9 is a transverse, sectional view of a link of the type used in the second conveyor means and illustrating slide means which force article components against component registering, abutment means carried by the FIGURE 6 links of the first conveyor means.

Link chain means 8 is fabricated from a plurality of links 801 each of which are generally similar to links 701 but inverted in relation thereto. Thus each link 801 includes a link body 802 similar to link body 702. A link body cap 803 is employed to close the upper end of each link body 802 as shown in FIGURE 9. It is to be noted that link body cap 803 lacks the registration pin such as the registration pin 723 mounted on link body caps 720.

A cavity 804, extending vertically and longitudinally of link body 802 has a generally oval cross section. Cavity 804 is intersected by transversely extending body slots 805 and 806 corresponding respectively to slots 708 and 709 of a link body 702.

Link chain means 8 is provided with a plurality of vertically reciprocating slide assemblies 807. Each assembly 806 is slidably mounted in link cavity 804 and is adapted to be projected into an axially aligned connector receiving cavity 706 of first link chain means 7 to insure the proper registration of the components of each connector assembly.

Each slide assembly 8 comprises a body portion 807 having an oval cross section corresponding in general to the cross section of cavity 804. As illustrated, slide body portion 808 is adapted to project slidably through the lower end 804a of cavity 804.

Slide body 808 carries a pair of oppositely and transversely extending stub axles 809 and 810 upon which are respectively mounted roller type cam followers 811 and 812. Cam roller 811 is secured on axle 809 by a washer 813 and a snap ring 814 while cam roller 812 is secured on axle 810 by washer 815 and snap ring 816. As illustrated stub axle 809 projects slidingly through body slot 805 while axle 810 projects slidingly through body slot 806.

A generally frustoconical slide component 817 is mounted on the lowermost end of slide body 808 and is secured by a connecting rod 818 having a beaded over or riveted lower end 818a. Sleeve 817 may be fabricated of Teflon so as to have minimum friction producing properties.

Sleeve 817 provides a frustoconical surface 817a and an annular shoulder 817b. Rod end 818a defines an abutment disposed centrally of the lower end of slide 807.

In a manner to be subsequently described, each rod end 818a is adapted to engage an insert 103 when the slide 807 containing this rod is depressed so as to extend into a cavity 706. When so projected, annular shoulder 817b is adapted to engage the upper end of a shell 102 while frustoconical surface 817a projects partially into the upper end of a plastic length 103.

Link chain means 8 is supported on and driven by sprocket wheels so as to travel through a horizontal path superposed above first link chain means 7.

Sprocket wheels supporting link chain means 8 may comprise sprocket wheel assemblies 819 and 820. Upper sprocket wheel portions of sprocket wheel assemblies 724, 725, and 726, 727, 728 and 729 also engage link chain means 8 in a conventional and obvious fashion, not shown.

The meshing inner engagement between link chain means 8 and the various sprocket wheel assemblies with which it is engaged is similar in character to the meshing interengagement heretofore described in connection with link chain means 7 and the sprocket wheel assemblies which this conveyor means engages.

The commonly driven sprocket wheel portions of sprocket wheel assembly 724, which engage both link chain means 7 and 8, serve to transmit driving energy from link chain means 7 to link chain means 8. This transmission of driving energy effects the coordinated drive of these two link chain means and aligns these link chain means so that the slide means 807 of link chain means 8 are axially aligned with the component receiving cavities 706 of lower link chain means 7 when these two link chain means are aligned.

The flight portion of link chain means 8 extending in the direction of chain travel from sprocket wheel 819 to sprocket wheel 820 may be supported by an arrangement schematically shown in FIGURE 12. As there shown, a frame portion 821 mounted on base 731 supports a lower support rail 822 and an upper guide rail 823. As illustrated, rails 822 and 823 are provided with mutually facing rail grooves 822a and 823a adapted respectfully to engage and support or guide the lower and upper ends of links 801. Generally C-shaped cam tracks 824 and 825 are carried by frame portion 820 and adapted respectfully to receive roller type cam followers 811 and 812 of the slide assemblies 807.

When link chain means 7 and 8 engage sprocket wheel assembly 724, they are brought into immediately superposed alignment, as shown by reference to FIGURE 13. This superposed alignment continues while link chain means 7 and 8 move through heating station 9 and cooling station 10 until the link chain means 7 and 8 reach sprocket wheel assembly 819. At sprocket assembly 819 link chain means 8 is deflected horizontally toward sprocket wheel assembly 820 while lower link chain means 7 continues to ejection station 11 and first turret means 2.

The arrangement of the superposed chain means 7 and 8 which exist in the travel direction of these chain means from sprocket wheel assembly 820 to sprocket wheel assembly 819 and extends through heating station 9 and cooling station 10 is exemplified in FIGURE 13. This arrangement comprises frame means 826 connected to base 731 and supporting lower support rail 732, upper guide rails 823 and cam tracks 734, 735, 824 and 825. As will be appreciated these cam tracks may be discontinuous. For example, they need not extend around the various sprocket wheel assemblies of the system with which they are engaged.

As shown in FIGURE 13, the lower ends of the links 801 of link chain means 8 may rest directly upon the upper ends of the links 701 of link chain means 7 when the link chains 7 and 8 are in superposed alignment. The upper and lower ends respectively of links 701 and 801 may partially project into slotted guide rail means 827 as schematically shown in FIGURE 13.

*Reciprocating operation of slide assemblies of first and second link chain means*

As heretofore noted, the desired vertical positioning and movement of slide assemblies 710 of link chain means 7 are controlled by the elevation of cam tracks 734 and 735. Similarly the desired vertical positioning and movement of slide assemblies 807 are controlled by the the positioning of cam tracks 824 and 825. Thus, as shown in FIGURE 10, cam track 825 is an elevated position prior to the entry of link chain means 8 into the heating station 9. Cam track 825, and of course track 824, are depressed to their lowermost position immediately prior to the entry of link chain means 8 into heating station 9 as shown in FIGURE 10 so as to move the slide assemblies 807 downwardly into axially aligned cavities 706 of link chain means 7. As will be hereinafter described, this downward movement of each slide assembly 807 insures the proper positioning of connector components within the link chain means cavities 706 during the contracting and setting of plastic sleeves 101.

As will be appreciated cam tracks 824 and 825 are elevated subsequent to their exit from cooling station 10 and prior to the point where link chain means 7 and 8 separate in the vicinity of sprocket wheel assembly 819. This elevation completes the withdrawal of slide assemblies 807 from cavities 706 prior to the separation of link chain means 7 and 8.

In the vicinity of point X, shown in FIGURE 4, cam tracks 734 and 735 are elevated so as to effect the raising of slide assemblies 710. This elevation of slide assemblies 710, moved formed connectors 1 axially and upwardly out of cavities 706 where they may be discharged from link chain means 7 and collected at ejection station 11 as hereinafter described. Subsequent to ejection station 11 and prior to first turret means 2, cam tracks 734 and 735 may be again be depressed to their lower most positions so as to restore slide assemblies 710 to their positions shown in FIGURE 6.

*Sleeve contracting means*

FIGURE 4 schematically illustrates an arrangement by means of which each plastic sleeves 101 may be contracted about shells 102.

As shown in FIGURE 4, connector assemblies, including outer plastic sleeves 101, are transported through a heating station 9. The interior of heating station 9 may be heated by conventional means such as radiant heating or circulated hot air or gas. The extent of travel time and the temperature within heating station 9 are so regulated as to insure the proper contraction of sleeves 101, depending of course upon the thermal properties of the plastic of these sleeves.

Following the thermally induced contraction of the sleeves 101, the connector assemblies are then transported through cooling station 10. While connector assemblies are transported on link chain means 8 through cooling station 10, the plastic sleeves 101 are restored to a sufficiently cool temperature to effect the setting of the previously softened material of the sleeves. Conventional cooling or refrigerating means may be employed to obtain a desired temperature within cooling station 10.

*Article ejection station*

FIGURE 4 schematically illustrates a representative type of article ejection system which may be employed in conjunction with the connector assembly apparatus of this invention. As there shown, a nozzle 1101 is employed to direct an air blast laterally across the upper end of link chain means 7 so as to move connectors 1, which have been projected out of cavities 706 by upwardly moving slide assemblies 710, laterally into collecting means such as a hopper or bin 1102.

*Overall mode of operation of system*

Detailed aspects of the sequential operation of various components of the overall apparatus are illustrated in FIGURES 20, 25, and 26 through 33.

In describing the overall mode of operation of the overall apparatus, reference wil be made to the sequential operations involved in the assembly of components of an individual connector 1.

As previously described, plunger type feeding means 4, functions to supply a plastic sleeve 101 to a loading slot 234a of loading disc 234 of turret means 2.

A plunger assembly 211 of turret means 2 is moved vertically downwardly to effect the axial pushing of the sleeve 101 off of loading disc 234 and into a cavity 706 of link chain means 7. This downward movement of plunger assembly 211 occurs between stations C and A as shown in FIGURES 14 and 20. FIGURE 26 illustrates sleeve 101 in a transition state between points C and A of travel of turret means 2.

Link chain means 7 conveys the plastic sleeve 101 to turret means 3 where it telescopingly receives an assembled insert 103 and shell 102.

As shown in FIGURES 21 and 25, a plunger assembly 311 of turret means 3 has started on its downward movement at point N. By point O in the rotational travel path of the turret means 3, the assembly 311 has pressed an insert 103 downwardly and axially out of a slot 334a' of loading disc 334', through a constricted aperture 339a, and into a loading slot 334a of lower loading disc 334.

FIGURE 27 schematically illustrates the insert 103 being pushed axially through a constricting aperture 339a by a lower plunger assembly portion 318 and beginning to enter a shell 102 carried in a loading slot 334a.

Continued rotation of turret means 3 between points O and P involves a dwell period where the plunger assembly 311 undergoes no further downward movement. When point P in the travel path of turret means 3 is reached, plunger assembly 311 resumes its downward movement. This movement causes the axial displacement of the prior assembled connector components 102 and 103 downwardly and out of loading slot 334a and into the plastic sleeve 101 contained within an axially aligned link cavity 706 as shown in FIGURE 28. FIGURE 28 illustrates the disposition of connector components while they are disposed on turret means 3 between points P and Q of the rotational travel path of this turret means.

At a point immediately to the left of sprocket assemblies 724 in FIGURE 4, where link chain means 7 and 8 have just been brought into superposed alignment, a slide assembly 807 of a link 801 is disposed in an elevated position above and axially aligned with the connector components 101, 102 and 103 previously inserted into the link cavity 706. This disposition of apparatus components is shown in FIGURE 29.

At a point between sprocket wheel assembly 724 and the entrance to heating chamber 9, the elevation of cam tracks 824 and 825 is lowered so as to cause the slide assembly 807 shown in FIGURE 29 to be depressed axially downwardly and enter the upper end 707 of link cavity 706. As shown in FIGURE 30, this downward movement of slide assembly 807 is sufficient to cause frustoconical surface 817a to partially enter the upper end of sleeve 101.

Frustoconical surface 817a, which may have a relatively small taper on the order of two degrees, is configured so as to engage the upper end of sleeve 101 and force it downwardly. The lower end of sleeve 101 moves downwardly until it engages abutment surface 711a of slide 710 as shown in FIGURE 30. Annular shoulder 817b of slide assembly 807 engages the upper end of shell 102 as shown in FIGURE 30 so as to force the lower end of shell 102 into engagement with abutment 723a of link 701. Central abutment 818a of slide assembly 807 engages the upper end of insert 103 to depress it to the desired extent within shell 102. As will be appreciated, this cooperation between slide assemblies 807 and 710 and abutment 723a effects the desired registration or positioning of the three components of the connector 1.

While the connector is moving through heating station 9 and cooling station 10, slide assemblies 807 and 710 may remain in their lowermost positions shown in FIGURE 30 so as to maintain the desired alignment of the connector components.

While the connector components are being carried through heating station 9, the exposure of sleeve 101 to a heated environment will induce the contraction of the sleeve 101 about the shell 102. The lower end 101a of the sleeve 101 will contract to the extreme extent shown in FIGURE 31 while the intermediate portion of the sleeve 101 lying adjacent the periphery of shell 102 will contract so as to firmly engage this shell periphery. Frustoconical surface 817a will prevent or limit inward contraction of the upper end 101b of the sleeve 101 so as to maintain an open, upper sleeve end of a desired minimum size.

Figure 32:
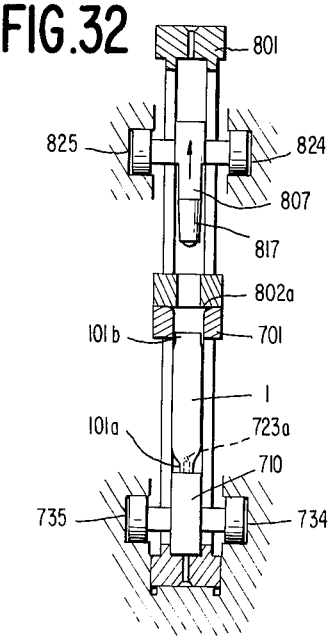

After the connector 1 has issued from cooling station 10 and before it has passed by sprocket assembly 819 and while link chain means 7 and 8 remain in superposed alignment, cam tracks 824 and 825 are again elevated so as to effect the upward retraction of the slide assembly 807 completely out of cavity 706. Accidental withdrawal of the connector with the upwardly moving slide assembly 807 is prevented by a lower annular stripping shoulder 802a of link body 802 shown in FIGURE 32. FIGURE 32 illustrates the disposition of slide assemblies 807 and 710 subsequent to the upward withdrawal of the assembly 807.

Figure 33:
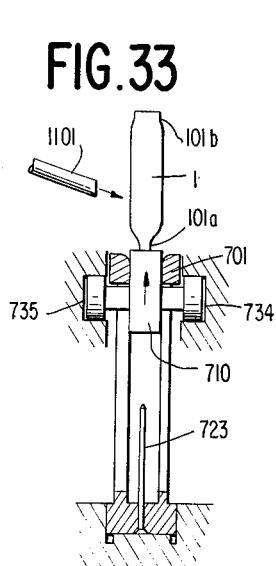

After link chain means 7 and 8 have moved past sprocket assembly 819 and separated as shown in FIGURE 4, and prior to the point where connectors 1 are ejected from link chain means 7, cam tracks 734 and 735 are elevated as shown in FIGURE 33 so as to effect the elevation of slide assembly 710. The elevation of slide assembly 710 carries with it the formed connector 1 and displaces the connector 1 out of link cavity 706 to a point immediately above chain link means 7. At this point the contracted character of lower end 101a of sleeve 1 about the upper end 723a of abutment rod 723 may lightly secure the connector 1 to the link chain means 7. As shown in FIGURE 33 an air or gas blast laterally directed from nozzle 1101 may be employed to exert a transverse force on the upwardly projected connector 1 so as to topple this connector into the receiving bin or hopper 1102 at the ejection station 11.

*Modified arrangement for assembly of connector having open ended shell component*

With very little modification, the apparatus heretofore described may be adapted to the assembly of modified electrical connectors 1'.

Such modified connectors 1' comprise an outer, heat shrinkable plastic sleeve 101, an inner, pronged insert 103 and a modified, intermediate shell component 102'.

As shown in FIGURE 34 modified shell component 102' is open at each end and thus differs from the previously described shell 102 which has one end 102a closed.

As will be apparent, turret means 2 and 3 may be utilized to supply all of the components of the modified connector 1' to link chain means 7 without alteration.

FIGURE 34 illustrates modified slide assembly arrangements which may be utilized with link chain means 7 and 8 to effect the proper alignment of the components of the modified connector assembly 1'.

As shown in FIGURE 34, link chain means 8 includes links 801 having slide assemblies 807 identical to that previously described. Link chain means 7, however, includes links 701 which are provided with slide assemblies 701' which are similar to assemblies 807.

The desired vertical reciprocating movement of slide assemblies 807' and 807 of link chain means 7 and 8 is effected by cam track means such as those previously described.

FIGURE 37, beneath FIGURE 10, illustrates a modified travel path for link chain means 8 which may be utilized with the modified combination shown in FIGURE 34. As shown in FIGURE 37, link chain means 8 extends from between sprocket wheel assembly 820 and sprocket wheel assembly 724 to sprocket wheel assemblies 725 and 726 within heating station 9. Link chain means 8, upon exiting from heating station 9, is engaged by a sprocket wheel assembly 828 to pass to sprocket wheel assembly 829 and return to sprocket wheel assembly 724 without passing through cooling station 10.

When the vertically superposed and aligned link chain means 7 and 8 are aligned and approaching heating station 9, the slide assemblies 807' and 807 of link chain means 7 and 8 are disposed as shown in FIGURE 34 with the slide assemblies 807 of the upper link chain means 8 moved downwardly into the cavities 706 of the link 701. With this arrangement, opposite ends of the assembly of telescoped connector components are engaged by slide assemblies 807' and 807 in a manner similar to that in which the slide assembly 807 engaged the upper end of components of connector 1 as described in connection with FIGURE 31. With this arrangement, the lower end 101a of a plastic sleeve 101 projects past a frustoconical, Teflon sleeve component 817' of a slide 807' to engage an annular abutment 830 formed on the body of this slide.

The lower end 102a' of a shell 102' engages an annular shoulder 817b' on a lower slide 807' carried by link chain means 7 while a central abutment 818a' of this slide engages the lower end of the insert 103.

The upper slide assembly 807 of link chain means 8 is projected downwardly such that its frustoconical Teflon sleeve 817 extends into the upper end 101b of sleeve 101 and forces sleeve 101 downwardly into solid engagement with annular abutment 830. Annular shoulder 817b of the slide assembly 807 engages the upper end of shell 102' to force it downwardly into engagement with annular shoulder 817b' of the slide assembly of link chain means 7. Central abutment 818a engages the upper end of insert 103 to force this insert down into engagement with the central abutment 818a' of the lower slide assembly. Thus, the cooperation of the converged slide assemblies 807' and 807 of the link chain means 7 and 8 serves to properly register the components of the modified connector 1'.

In the vicinity of point Y, immediately prior to the entry of the aligned link chain means 7 and 8 into heating station 9, the slide 807 of link chain means 8 may be withdrawn upwardly, it having completed its registration function. During the upward withdrawal of slide assembly 807, a stripping shoulder 802a on the link 801 effectively prevents upward movement of the components of the modified connector assembly 1'.

FIGURE 35 illustrates the arrangement of modified connector and link chain components as they enter the heating chamber 9 in preparation for the contraction of outer plastic sleeve 101.

During the passage of the modified connector components through the heating station 9, the upper end 101b of the sleeve 101 will contract to assume the restricted configuration shown in FIGURE 36. Contraction of the lower end 101a of the sleeve 101 is prevented by the Teflon sleeve 817'.

After the connector 1' has exited from heating station 9, and prior to its arrival at station 12, i.e. in the vicinity of point Z shown in FIGURE 37, slide assembly 807' is elevated so as to project the constricted sleeve end 101b above the link chain means 7 as shown in FIGURE 36. This upwardly projecting end 101b may then be carried between counter rotating, pinch roll 1201 and 1202 so as to form a completely closed and pinched together sleeve end. A reciprocating knife 1203 may be employed to trim the upper end of the pinched closed sleeve end 101b as schematically set forth in FIGURE 36. By regulating the height of slide 807' in relation to the elevation of trimming knife 1203, the proper distance d' between the uppermost ends of sleeve 101 and shell 102' may be maintained.

*Some advantages of the invention*

The characteristics of the component feeding turrets and the lower link chain means, both separately and in combination, are such as to insure positively controlled handling, transportation, and assembling of article components. These elements of the overall apparatus further contribute to the rapid assembly of article components and minimize the possibility or likelihood of improper component assembly or component damage.

Proper and accurate registration of article components is insured by the unique combination of the abutment and slide components of the upper and lower link chain means.

The slide assemblies provide a particularly effective, yet structurally simple, mechanism for maintaining one end of a plastic sleeve component open during the sleeve contracting operation.

The overall apparatus is characterized by basic simplicity and ease of operation and control.

*Scope of the invention*

While the invention has been described with reference to preferred embodiments and representative multi-component articles to be assembled, those skilled in the art will recognize the applicability of the invention to multi-component articles other than those described in this application. Such individuals will additionally realize, with the benefit of the disclosure of this invention, that additions, deletions, substitutions and other modifications may be made with respect to the specifically disclosed apparatus and its sequence of operation which would fall within the purview of the invention as set forth in the appended claims.

I claim:
1. An apparatus for transporting multi-component articles, said apparatus comprising:
   link chain means;
   at least some of the links of said link chain means each including an article receiving cavity which has at least one open end;
   slide means mounted in at least some of said cavities;
   means for reciprocating said slide means axially of said cavities to displace articles therefrom; and
   registration means contained within at least some of said cavities and adapted to define positions of selected alignment for at least some of the components of said articles.
2. An apparatus as described in claim 1 wherein said registration means comprise:
   an abutment projecting axially through said slide means into said cavity and adapted to engage one component of an article; and
   annular shoulder means carried by said slide means adapted to engage another, generally tubular component of said article;
   said abutment means being adapted to project partially into the interior of said generally tubular article component.
3. An apparatus for handling multi-component articles, said apparatus comprising:
   first flexible conveyor means;
   second flexible conveyor means;
   said first conveyor means defining a plurality of multi-component article receiving cavities;
   abutment means carried by said first conveyor means and adapted to define positions of relative alignment of at least some of the components of said articles; and
   slide means carried by said second conveyor means and adapted to be projected toward and at least partially into the cavities of said first conveyor means to force article components against said abutment means.
4. An apparatus for handling multi-component articles, said apparatus comprising:
   article conveyor means;
   link chain means;
   slide means carried by at least some of the links of said link chain means;
   frustoconical surface means carried by at least some of said slide means and adapted to partially enter a first component of an article carried by said article conveyor means;

said frustoconical surface means being adapted to limit contraction of a portion of said first article component while the remainder of said first article component is being contracted about a second article component;

annular shoulder means carried by at least some of said slide means and adapted to engage a second component of an article carried by said article conveyor means; and central abutment means carried by at least some of said slide means and adapted to engage a third article component carried by said article conveyor means.

5. An apparatus for handling multi-component articles, said apparatus comprising:

first link chain means;

at least some of the links of said first link chain means each including an article receiving cavity which has at least one open end;

first slide means mounted in at least some of said cavities;

means for reciprocating said first slide means axially of said cavities to displace articles therefrom;

registration means contained within at least some of said cavities and adapted to define positions of selected alignment for at least some of the components of said articles;

second link chain means;

second slide means carried by at least some of the links of said second link chain means;

frustoconical surface means carried by at least some of said second slide means and adapted to partially enter a first component of an article carried within a cavity of said first link chain means;

said frustoconical surface means being adapted to limit contraction of a portion of said first article component while the remainder of said first article component is being contracted about a second article component within a cavity of said first link chain means;

annular shoulder means carried by at least some of said second slide means and adapted to engage a second component of an article carried with a cavity of said first link chain means; and central abutment means carried by at least some of said second slide means and adapted to engage a third article component carried within a cavity of said first link chain means.

6. An apparatus for assembling multi-component articles, said apparatus comprising:

article component supplying means;

plunger means carried by said article component supplying means;

flexible, article conveyor means adapted to travel through a path, at least a portion of which is generally axially aligned with said plunger means;

a plurality of article component loading stations mounted on said article supplying means between said plunger means and said flexible, article conveyor means;

means to prevent article components from moving off of said article component supplying means and onto said article conveyor means while said plunger means effect the convergence and telescoping assembly of article components on said article carrying means; and article component constricting means between adjacent article component loading stations and adapted to constrict some article components being moved by said plunger means from one article loading station to another article loading station into telescoping assembly with other article components.

7. An apparatus for assembling multi-component articles, said apparatus comprising:

turret means;

a plurality of article component feeding means adapted to successively supply article components to said turret means;

plunger means carried by said turret means and adapated to successively, axially assemble some article components and to thereafter move said assembled article components telescopingly into other article components;

flexible conveyor means adapted to transport said assembled articles, said flexible conveyor means defining cavities adapted to contain said assembled articles; and means carried by said flexible conveyor means and adapted to define selected positions of alignment of at least some of said components of said articles.

8. An apparatus for assembling multi-component articles, said apparatus comprising:

turret means;

first feeding means adapted to successively supply first article components to said turret means;

second feeding means adapted to successively supply second article components to said turret means;

third feeding means adapted to successively supply third article components to said turret means;

plunger means carried by said turret means and adapted to successively, telescopingly assemble two of said article components and to thereafter move said assembled two components telescopingly into the other of said article components;

link chain means adapted to transport said assembled articles, said link chain means including links having cavities adapted to contain said assembled articles; and means carried by said link chain means and adapted to define selected positions of alignment of at least some of said components of said articles.

9. An apparatus for assembling multi-component articles, said apparatus comprising:

first turret means;

a first article component loading station mounted on said first turret means;

means for successively feeding outer components of said articles to said first loading station;

second turret means;

a second article component loading station mounted on said second turret means;

a third article component loading station mounted upon said second turret means;

means for successively feeding intermediate components of said articles to said second loading station;

means for successively feeding inner components of said articles to said third loading station;

link chain means adapted to transport assembled articles, said link chain means including links having cavities adapted to receive article components;

first plunger means carried by said first turret means and adapted to move said outer article components off of said first loading station and into cavities of said link chain means;

second plunger means carried by said second turret means and adapted to successively assemble inner and intermediate article components by moving said inner article components off of said third loading station and axially into intermediate article components on said second loading station and to thereafter move said assembled intermediate and inner components off of said second loading station and telescopingly into outer article components contained within cavities of said link chain means; and means carried by said link chain means and adapted to define selected positions of telescoping alignment of said outer and intermediate article components.

10. An apparatus as described in claim 9 including:
    means to prevent movement of said intermediate article components off of said second loading station while said second plunger means are advancing said inner article components axially thereto;
    means for constricting said inner article components while said inner article components are being moved into said intermediate article components;
    means for contracting said outer component of each article about said intermediate component; and
    means for limiting the contraction of at least a portion of each of said outer components while the remainder of said outer components are being contracted.

11. An apparatus for feeding articles, said apparatus comprising:
    article supplying means;
    article receiving means;
    plunger means for moving articles from said article supplying means to said article receiving means, said plunger means including
        a first plunger portion,
        a second plunger portion telescopingly connected with said first plunger portion and adapted to engage articles, and
        clutch means adapted to releasably secure said first and second plunger portions in mutually extended relationship and adapted to allow relative convergence of said first and second plunger portions when movement of said second plunger portion is impeded;
    means adapted to reciprocate said first plunger portion toward and away from said article receiving means;
    means for re-extending said first and second plunger portions when said first and second plunger portions have been converged, said re-extension being effected in response to movement of said first plunger portion away from said article receiving means; and
    signal means carried by said plunger means and adapted to project outwardly of said plunger means in response to the convergence of said plunger means portions.

12. A method for transporting multi-component articles, said method comprising:
    disposing a plurality of relative movable article components within article receiving cavities of link chain means in mutually telescoped relation;
    registering at least some of the telescoped components of said articles within said cavities while said link chain means is in motion;
    contracting one of said components about another component within a link chain means cavity while said link chain means is in motion; and
    thereafter displacing said articles out of said cavities.

13. A method for handling multi-component articles, said method comprising:
    disposing a plurality of relatively movable article components in mutually telescoped rotation within article cavities defined on first flexible conveyor means;
    bringing second flexible conveyor means into superposed alignment with said first flexible conveyor means; and
    registering at least some of the telescoped components of said articles within said cavities while said first flexible conveyor means is in motion by projecting slide means carried by said second flexible conveyor means into said cavities and into engagement with said components.

14. A method for handling multi-component articles, said method comprising:
    conveying telescoped article components on article conveyor means;
    carrying slide means on links of link chain means into superposed alignment with said article conveyor means;
    projecting frustoconical surface means carried by at least one of said slide means partially into a first component of an article carried by said article conveyor means; and
    contracting said first component with said frustoconical surface means being adapted to limit contraction of a portion of said first article component while the remainder of said first article component is being contracted about a second article component with said link chain means and conveyor means being in motion.

15. A method for assembling multi-component articles, said method comprising:
    loading diverse article components on article component supplying means;
    assembling diverse article components on said article component supplying means while preventing movement of said assembled components off of said component supplying means;
    said assembly of components being accomplished while constricting some components as they are being moved into others; and
    transferring said assembled components onto continuous conveyor means.

16. A method for assembling multi-component articles, said method comprising:
    successively supplying first article components to turret means;
    successively supplying second article components to said turret means;
    successively supplying third article components to said turret means;
    telescopingly assembling two of said article components on said turret means and thereafter moving said assembled two components telescopingly into the other of said article components;
    transporting said assembled articles on link chain means, said link chain means including links having cavities adapted to contain said assembled articles; and
    aligning at least some of said components in predetermined positions while they are within said cavities and being transported by said link chain means.

17. A method for assembling multi-component articles, said method comprising:
    successively supplying first article components to turret means;
    successively supplying second article components to said turret means;
    successively supplying third article components to said turret means;
    telescopingly assembling two of said article components on said turret means and thereafter moving said assembled two components from said turret means telescopingly into the other of said article components;
    transporting said assembled articles on link chain means, said link chain means including links having cavities adapted to contain said assembled articles;
    aligning at least some of said components in predetermined positions while they are within said cavities and being transported by said link chain means; and
    contracting the outermost of said assembled components within a link chain cavity while said link chain means is in motion by conveying said assembled components first through a heated environment and then through a cooled environment.

18. An apparatus for assembling multi-component articles, said apparatus comprising:
    article component supplying means;
    plunger means carried by said article component supplying means;
    a plurality of article component loading stations mounted on said article supplying means;
    means to prevent article components from moving off of said article component supplying means while said plunger means effect the convergence and telescoping assembly of article components on said article carrying means; and article component constricting means between adjacent article component loading stations and adapted to contrict some article components being moved by said plunger means from one article loading station to another article loading station into telescoping assembly with other article components.

19. A method for assembling multi-component articles, said method comprising:

loading diverse article components on article component supplying means while said article component supplying means is in motion; and assembling diverse article components on said article component supplying means while preventing movement of said assembled components off of said article component supplying means;

said assembly of components being accomplished while constricting some components as they are being moved into others.

References Cited by the Examiner

UNITED STATES PATENTS

| | | | |
|---|---|---|---|
| 2,515,881 | 7/50 | McKenny | 29—203 |
| 2,526,717 | 10/50 | Weisberg | 29—33 |
| 2,736,358 | 2/56 | Burge et al. | 29—203 |
| 3,126,086 | 3/64 | Holben | 198—24 |
| 3,161,915 | 12/64 | Thiel | 18—19 |

WHITMORE A. WILTZ, *Primary Examiner.*